United States Patent
Bridge et al.

(10) Patent No.: US 9,160,914 B2
(45) Date of Patent: Oct. 13, 2015

(54) USER CONTROL OF THE VISUAL PERFORMANCE OF A COMPRESSIVE IMAGING SYSTEM

(75) Inventors: Robert F. Bridge, Austin, TX (US); Donna E. Hewitt, Austin, TX (US); Tyler H. Weston, Austin, TX (US)

(73) Assignee: InView Technology Corporation, Austin, TX (US)

( * ) Notice: Subject to any disclaimer, the term of this patent is extended or adjusted under 35 U.S.C. 154(b) by 655 days.

(21) Appl. No.: 13/534,249

(22) Filed: Jun. 27, 2012

(65) Prior Publication Data

US 2013/0002968 A1 Jan. 3, 2013

Related U.S. Application Data

(60) Provisional application No. 61/502,153, filed on Jun. 28, 2011.

(51) Int. Cl.
*H04N 5/64* (2006.01)
*H04L 27/00* (2006.01)
*H04N 5/232* (2006.01)
*H04N 19/97* (2014.01)

(52) U.S. Cl.
CPC ............... *H04N 5/232* (2013.01); *H04N 19/97* (2014.11)

(58) Field of Classification Search
CPC .............................. H04N 19/97; H04N 5/232
USPC .................................................. 375/240–242
See application file for complete search history.

(56) References Cited

U.S. PATENT DOCUMENTS

| 5,477,272 | A | * | 12/1995 | Zhang et al. | 375/240.06 |
| 5,539,467 | A | * | 7/1996 | Song et al. | 375/240.15 |
| 6,434,278 | B1 | * | 8/2002 | Hashimoto | 382/285 |
| 8,199,244 | B2 | | 6/2012 | Baraniuk et al. | |

(Continued)

OTHER PUBLICATIONS

U.S. Appl. No. 61/372,826, entitled "Compressive Sensing Systems and Methods", by Richard G. Baraniuk, Gary L. Woods, Kevin F. Kelly, Robert F. Bridge, Sujoy Chatterjee, and Lenore McMackin, filed on Aug. 11, 2010, 22 pages.

(Continued)

*Primary Examiner* — Dave Czekaj
*Assistant Examiner* — Md Haque
(74) *Attorney, Agent, or Firm* — Meyertons Hood Kivlin Kowert & Goetzel, P.C.; Jeffrey C. Hood; Mark K. Brightwell

(57) ABSTRACT

A compressive imaging system modulates an incident light stream and senses the modulated light stream to obtain compressive measurements. The measurements are algorithmically processed to reconstruct a sequence of images. The image sequence is displayed. The system receives user input (through a user interface) representing a user command to set or change one or more visual performance factors such as image quality and frame rate. The system immediately adjusts the visual performance factors by adjusting one or more underlying system parameters/algorithms. Thus, the visual consequences of any inputs to the user interface become immediately apparent in the displayed sequence of images. The user may therefore intuitively learn how to operate the user interface simply by making trial inputs and observing their effects in the displayed image sequence. The user interface may include one or more mechanical input devices and/or one or more graphical user interface (GUI) elements.

31 Claims, 14 Drawing Sheets

(56) References Cited

U.S. PATENT DOCUMENTS

| | | | |
|---|---|---|---|
| 2002/0171377 A1* | 11/2002 | Mueller et al. | 315/291 |
| 2002/0172426 A1* | 11/2002 | Honda et al. | 382/235 |
| 2003/0071907 A1* | 4/2003 | Karasaki et al. | 348/333.01 |
| 2006/0239336 A1* | 10/2006 | Baraniuk et al. | 375/216 |
| 2009/0077526 A1* | 3/2009 | Abrams et al. | 716/21 |
| 2009/0179867 A1* | 7/2009 | Shim et al. | 345/173 |
| 2012/0038786 A1 | 2/2012 | Kelly et al. | |
| 2012/0038789 A1 | 2/2012 | Kelly et al. | |
| 2012/0038817 A1 | 2/2012 | McMackin et al. | |

OTHER PUBLICATIONS

Takhar, et al., "A New Compressive Imaging Camera Architecture Using Optical-Domain Compression," Proc. IS&T/SPIE Computational Imaging IV, Jan. 2006, 10 pages.

* cited by examiner

USER CONTROL OF THE VISUAL PERFORMANCE OF A COMPRESSIVE IMAGING SYSTEM

RELATED APPLICATION DATA

This application claims the benefit of priority to U.S. Provisional Application No. 61/502,153, filed on Jun. 28, 2011, entitled "Various Compressive Sensing Mechanisms", invented by Tidman, Weston, Bridge, McMackin, Chatterjee, Woods, Baraniuk and Kelly, which is hereby incorporated by reference in its entirety as though fully and completely set forth herein.

FIELD OF THE INVENTION

The present invention relates to the field of compressive imaging, and more particularly, to mechanisms allowing a user to control performance factors such as the image quality and frame rate achieved by a compressive imaging system.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_S$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts include the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i): i=1, 2, ..., M} in the N-dimensional space, where M is larger than K but still much smaller than N. Each projection gives a corresponding real number s(i), e.g., according to the expression $$s(i)=<v,R(i)>,$$

where the notation <v,R(i)> represents the inner product (or dot product) of the vector v and the vector R(i). Thus, the series of M projections gives a vector U including M real numbers: $U_i=s(i)$. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. Pat. No. 8,199,244, issued Jun. 12, 2012 (invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {s(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In a compressive imaging system, an incident light stream from an external scene is modulated with a time sequence of spatial patterns, and the modulated light stream is sensed with a light detector. The electrical signal generated by the light detector is sampled by an analog-to-digital converter to obtain a sequence of samples. The samples may be bundled into groups. Each group of samples is acquired over a corresponding interval of time, and comprises an encoded representation of a corresponding image carried by the incident light stream during that time interval. Furthermore, each group of samples may be operated on by a computational algorithm to reconstruct the corresponding image. (The image is said to be "reconstructed" because it is recognized as having previously existed, although only transiently, in the incident light stream. By use of the term "reconstruct", we do not mean to suggest that the image has existed in stored digital form prior to the acquisition of the samples.) Thus, the compressive imaging system may generate a sequence of reconstructed images.

The field of compressive imaging is relatively new. Compressive imaging systems operate by mechanisms that are unfamiliar to the general public. The reconstruction algorithm used to reconstruct the image sequence is mathematically complex. Thus, it may be difficult for the user of a compressive imaging system to understand the underlying factors that affect the image quality and/or frame rate of the reconstructed image sequence. Therefore, there exists a need for mechanisms enabling users of compressive imaging systems to control performance factors such as image quality and/or frame rate.

SUMMARY

In one set of embodiments, a method for enabling user control of the visual performance of a compressive imaging system may include the following operations.

The method involves receiving an input signal from a user interface in response to user input, and determining one or more control parameter values in response to receiving the input signal. The user input may represent the user's command to set or change one or more visual performance factors such as image quality and/or frame rate.

The method also involves reconstructing a sequence of images from a data stream. Each of the images is reconstructed from a corresponding subset of the data stream. The data stream is acquired by modulating an incident light stream with a time sequence of spatial patterns to obtain a modulated light stream and by generating the data stream in response to the modulated light stream. The one or more control parameter values may be used to control the image quality and/or frame rate of the sequence of images. For example, the image quality and/or frame rate may be controlled by adjusting one or more variables of the modulation process and/or the datastream generation process and/or the reconstruction process.

The method may also involve displaying the image sequence via a display device. The reconstruction and display operations may be performed while the incident light stream is being modulated. Furthermore, the image quality and/or frame rate of the image sequence may be dynamically adjusted in response to user inputs. The user is thus able to immediately perceive the visual effects of the user inputs by observing the displayed image sequence. Therefore, the user may easily and intuitively learn how to operate the user interface simply by trying various user inputs and observing their visual effects in the display.

In some embodiments, the frame rate may be controlled by adjusting one or more of the following: a number of superpixels into which the spatial patterns are partitioned; a size of a subset to which the spatial patterns are restricted; a size of the subsets of the data stream used to reconstruct corresponding image of the image sequence; an extent of overlap between consecutive ones of the subsets of the data stream; a sampling rate of an analog-to-digital conversion device that acquires the data stream; an integration time of a light sensing device that senses the modulated light stream.

In some embodiments, the image quality may be controlled by adjusting one or more of the following: a selection of a reconstruction algorithm to be used to perform the reconstruction of the image sequence; a number of reconstruction algorithms to be used to perform the reconstruction of the image sequence; whether or not an adaptive reconstruction algorithm is used to perform the reconstruction of the image sequence; a size of the subsets of the data stream used to reconstruct corresponding images of the image sequence; whether or not active illumination is used to illuminate the scene under observation; a sampling rate of an analog-to-digital conversion device that acquires the data stream; an integration time of a light sensing device that senses the modulated light stream; one or more parameters of a reconstruction algorithm to be used to perform said reconstruction; a selection of one or more post-processing algorithms to apply to the sequence of images; one or more parameters of one or more post-processing algorithms to be applied to the sequence of images.

In one set of embodiments, a method for enabling user control of the performance of a compressive imaging system may involve the following operations.

The method may involve receiving an input signal from a user interface in response to user input, and determining one or more control parameter values in response to the input signal.

The method may also involve reconstructing an image from a set of samples. The one or more control parameter values may be used to control one or more performance factors such as the visual quality and latency of the image. (The latency of the image may be interpreted as the time delay between an initial command to acquire the image from the incident light stream and the display of the reconstructed image on the display device.) The set of samples is acquired by modulating an incident light stream with a time sequence of spatial patterns to obtain a modulated light stream and by generating the set of samples in response to the modulated light stream.

The method may also include displaying the image via a display device.

In one set of embodiments, a system may include a user interface and a processing unit as follows.

The user interface may be configured to generate an input signal in response to user input. The user input may represent the user's command to set or change one or more visual performance factors such as image quality and frame rate (or image latency). In some embodiments, the user interface may be configured to receive two-dimensional inputs. For example, the user interface may include a button or knob or graphical user interface that allows simultaneous motions along two perpendicular directions or axes. In other embodiments, the user interface may be configured to receive one-dimensional input. For example, the user interface may include a button or slider or graphical user interface that allows a one-dimensional range of motion.

The processing unit may be configured to execute program instructions stored in a memory. The program instructions, when executed by the processor, cause the processor to: receive the input signal from the user interface; determine one or more control parameter values in response to the input signal; reconstruct a sequence of images from a received data stream; control one or more visual performance factors such as image quality and frame rate of the sequence of images based on the one or more control parameter values; and display the sequence of images using a display device. Each of the images is reconstructed from a corresponding subset of the data stream. The data stream is acquired by modulating an incident light stream with a time sequence of spatial patterns to obtain a modulated light stream and by generating the data stream in response to the modulated light stream.

In one set of embodiments, a method for enabling user control of the visual performance of a compressive imaging system may include the following operations.

The method may include receiving an input signal from a user interface in response to user input, and determining one or more control parameter values in response to the input signal. The user input may represent a user command to set or adjust one or more visual performance factors such as image quality and frame rate (or image latency).

The method may also include modulating an incident light stream with a time sequence of spatial patterns to obtain a modulated light stream, and sensing the modulated light stream to generate a data stream representative of the modulated light stream.

The method may also include reconstructing a sequence of images from the data stream. The one or more control parameter values may be used to control the one or more visual performance factors of the image sequence, e.g., by controlling one or more variables of the modulation process and/or the datastream generation process and/or the reconstruction process.

In some embodiments, the method may also include: displaying the image sequence through a display device; and repeating the action of receiving the input signal and the action of determining the one or more control parameter values, to allow changes to the one or more control parameter values. The operations of modulating, sensing, reconstructing and displaying may be performed as a pipeline process, where each of the operations continuously consumes the output of the previous operation. The one or more visual performance factors may be dynamically adjusted in response to each change in the one or more control parameter values.

In one set of embodiments, a system may include a user interface, a light modulation unit, a light sensing device and a processor as follows.

The user interface may be configured to generate an input signal in response to user input.

The light modulation unit may be configured to modulate an incident light stream with a time sequence of spatial patterns to obtain a modulated light stream.

The light sensing device may be configured to sense the modulated light stream in order to generate a data stream representative of the modulated light stream.

The processor may be configured to: receive the input signal from the user interface; determine one or more control parameter values in response to the input signal; reconstruct a sequence of images from the data stream, where each of the images is reconstructed from a corresponding subset of the data stream; and control one or more visual performance factors such as image quality and frame rate of the sequence of images based on the one or more control parameter values.

Various additional embodiments are described in U.S. Provisional Application No. 61/502,153, filed on Jun. 28, 2011, entitled "Various Compressive Sensing Mechanisms".

BRIEF DESCRIPTION OF THE DRAWINGS

A better understanding of the present invention can be obtained when the following detailed description of the preferred embodiments is considered in conjunction with the following drawings.

Figure 1:
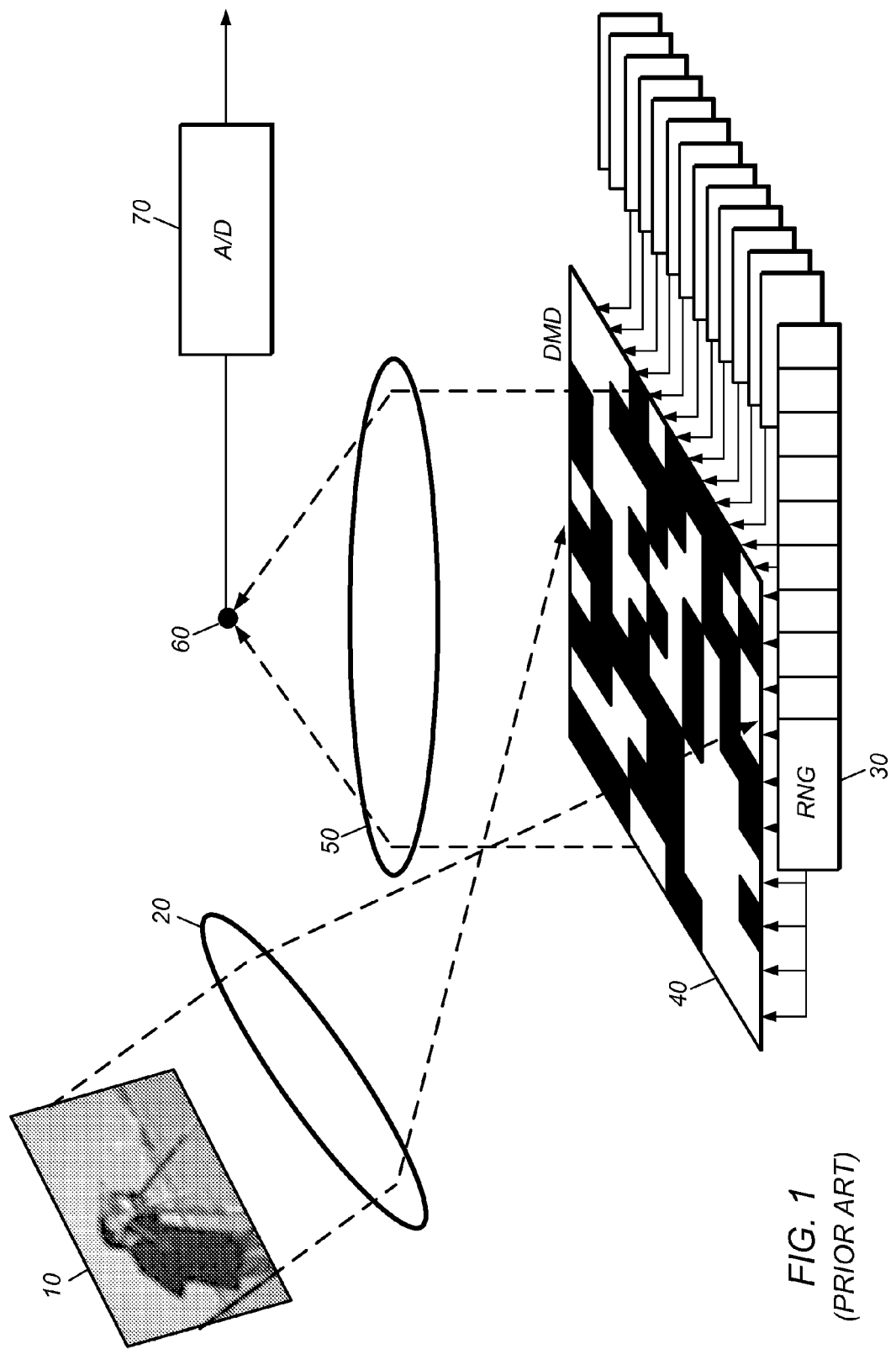
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), tablet computers, computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
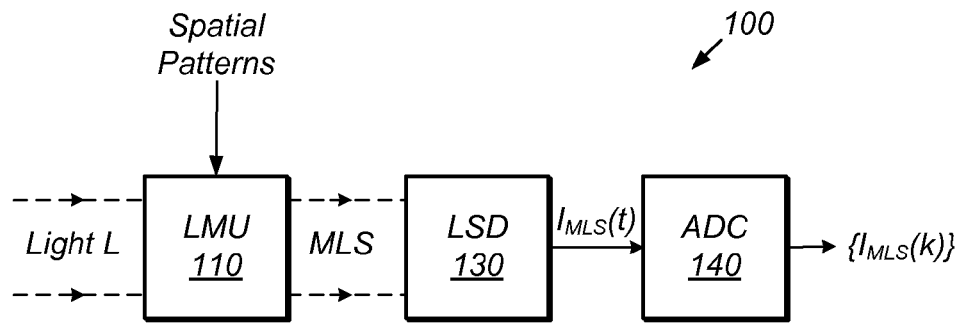
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding light stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then immediately retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12},2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range $[2^{24},2^{26}]$, in the range from $2^{26}$ to infinity. The particular value used in any given embodiment may depend on one or more factors specific to the embodiment.

The light sensing device 130 may be configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or an image sequence) and may be used to reconstruct the image (or image sequence) based on any reconstruction algorithm known in the field of compressive sensing. For reconstruction of an image sequence, the samples may be partitioned into contiguous subsets, and then the subsets may be processed to reconstruct corresponding images.

In some embodiments, the samples $\{I_{MLS}(k)\}$ may be used for some purpose other than, or in addition to, image (or image sequence) reconstruction. For example, system 100 (or some other system) may operate on the samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$ (or parameters derived from that sample set) being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing device 130 may include a bi-cell photodiode. As yet another example, the light sensing device 130 may include a focal plane array.) Each light sensing element generates a corresponding signal representing intensity of the corresponding spatial portion as a function of time. Each signal may be digitized (e.g., by a corresponding ADC, or perhaps by a shared ADC) to obtain a corresponding sequence of samples. Thus, a plurality of sample sequences are obtained, one sample sequence per light sensing element. Each sample sequence may be processed to reconstruct a corresponding subimage. The subimages may be joined together to form a whole image. The sample sequences may be captured in response to the modulation of the incident light stream with a sequence of M spatial patterns, e.g., as variously described above. By employing any of various reconstruction algorithms known in the field of compressive sensing, the number of pixels in each reconstructed subimage may be greater than (e.g., much greater than) M. To reconstruct each subimage, the reconstruction algorithm uses the corresponding sample sequence and the restriction of the spatial patterns to the corresponding sub-region of the array of light modulating elements.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity interested in producing any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity interested in producing any of these embodiments may use newer light sensing technologies (e.g., based on new materials or combinations of materials) that are not yet mature enough to be manufactured into focal plane arrays (FPA) with large pixel count. For example, new detector materials such as super-lattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In one embodiment, the light sensing device 130 may include one or more photomultiplier tubes (PMTs).

In some embodiments, a filter may be placed in front of the light sensing device 130 to restrict the modulated light stream to a specific range of wavelengths or specific polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
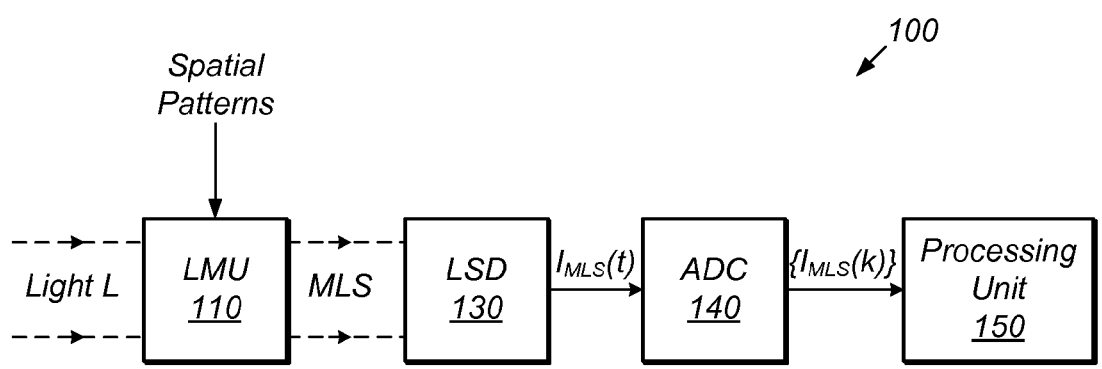
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be realized by one or more microprocessors, by one or more programmable hardware elements such as field-programmable gate arrays (FPGAs), by dedicated digital circuitry such as one or more application-specific integrated circuits (ASICs), or by any combination the foregoing. The processing unit 150 may be configured to perform one or more functions such as image reconstruction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video reconstruction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to reconstruct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video reconstruction. System 100 may allow a user to choose a desired algorithm and/or a desired transformation for performing the image/video reconstruction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to reconstruct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In various embodiments, the compression ratio M/n may take any of a wide variety of values. For example, in different sets of embodiments, M/n may be, respectively, in the range [0.9,0.8], in the range [0.8,0.7], in the range [0.7,0.6], in the range [0.6,0.5], in the range [0.5,0.4], in the range [0.4,0.3], in the range [0.3,0.2], in the range [0.2,0.1], in the range [0.1, 0.05], in the range [0.05,0.01], in the range [0.001,0.01].

Superpixels for Modulation at Lower Spatial Resolution

As noted above, the image reconstructed from the sample subset $Z_M$ may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_V$, where $k_H$ and $k_V$ are positive integers, would give an effective resolution equal to $N/(k_H k_V)$. In one alternative embodiment, cells near the center of the array may have smaller sizes than cells near the periphery of the array.

The "cells" of the above discussion are referred to herein as "superpixels". When the reconstruction algorithm generates an image (video frame) from the acquired sample data, each superpixel corresponds to one pixel in the reconstructed image (video frame).

Restricting the Spatial Patterns to a Subset of the Modulation Array

Another way the spatial patterns may be arranged to support the reconstruction of an n-pixel image with n less than N is to allow the spatial patterns to vary only within a subset (or region) of the array of light modulating elements. In this mode of operation, the spatial patterns are null (take the value zero) outside the subset. (Control unit 120 may be configured to implement this restriction of the spatial patterns.) Light modulating elements corresponding to positions outside of the subset do not send any light (or send only the minimum amount of light attainable) to the light sensing device. Thus, the reconstructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary in order to dynamically control the rate of image acquisition or video frame rate. In some embodiments, the size of the region may be determined by user input. For example, system 100 may provide an input interface (GUI and/or mechanical control device) through which the user may vary the size of the region over a continuous range of values (or alternatively, a discrete set of values), thereby implementing a digital zoom function. Furthermore, in some embodiments, the position of the region within the field of view may be controlled by user input.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) reconstruction in user-acceptable time. In this embodiment, the system 100 may store and/or transmit the samples $\{I_{MLS}(k)\}$ so that another agent, more plentifully endowed with processing resources, may perform the image/video reconstruction based on the samples.

Figure 2C:
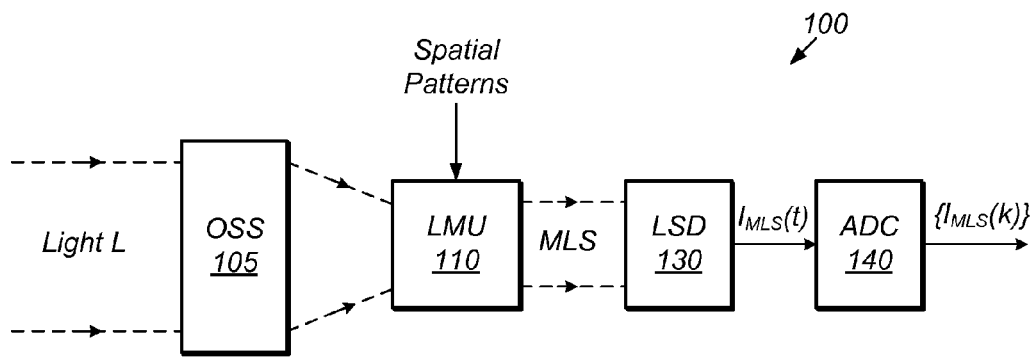
FIG. 2C illustrates an embodiment of system 100 that includes an optical subsystem (OSS) 105 to focus received light L onto the light modulation unit 110.
Figure 2D:
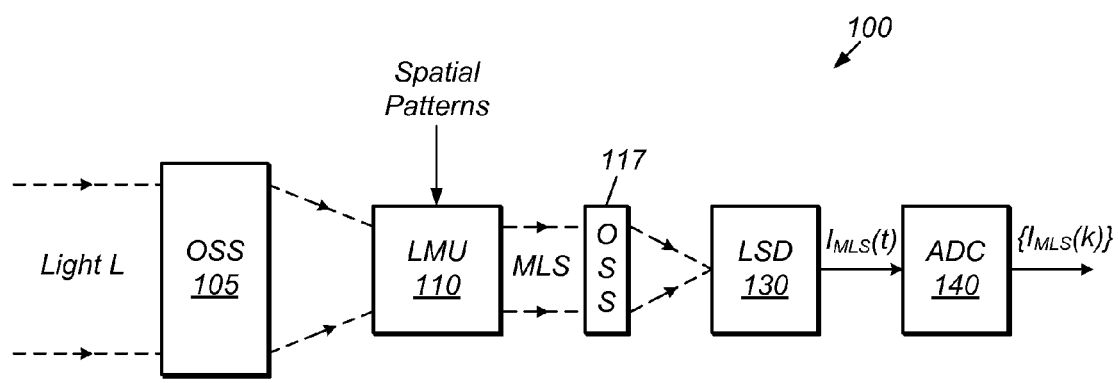
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. The optical subsystem 105 may allow manual and/or software control of one or more parameters such as focus, zoom, shutter speed and f-stop.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot); points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense at any given time the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
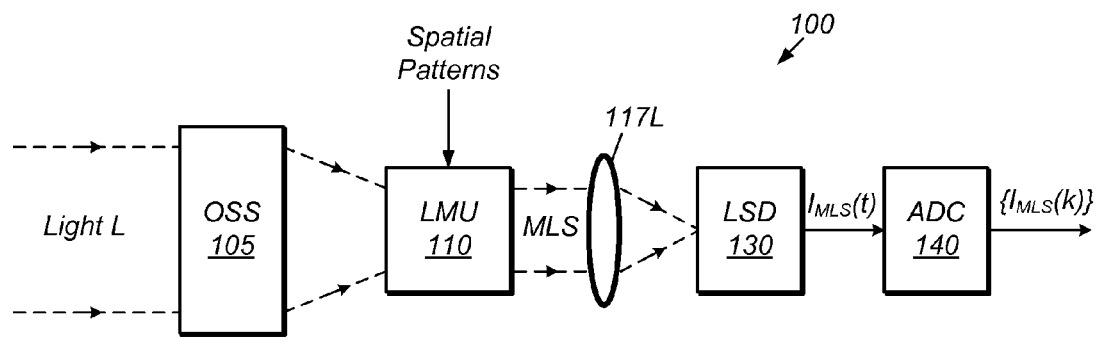
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to reconstruct a corresponding image (or video sequence) for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, where each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to reconstruct a corresponding image (or video sequence) for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to reconstruct a corresponding image (or video sequence) for the corresponding wavelength range.

Figure 2F:
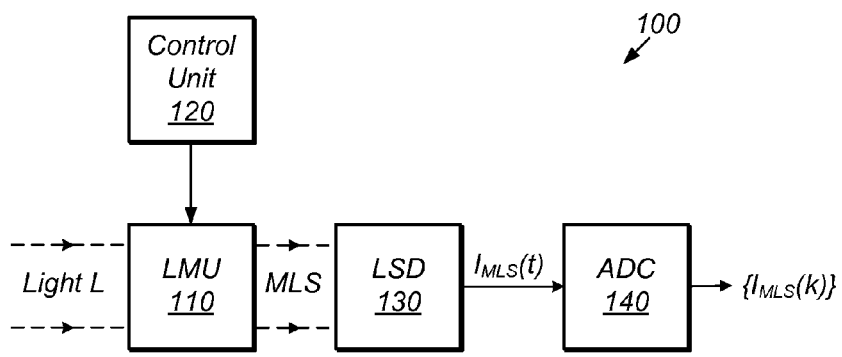
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the ADC 140 may be controlled by a common clock signal so that ADC 140 can coordinate (synchronize) its action of capturing the samples $\{I_{MLS}(k)\}$ with the control unit's action of supplying spatial patterns to the light modulation unit 110. (System 100 may include clock generation circuitry.)

In some embodiments, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying reconstructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

Coherence

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$} and B={$b_i$} in the same N-dimensional space, A and B are said to be incoherent if their coherence measure μ(A,B) is sufficiently small. Assuming the vectors {$a_i$} and the vectors {$b_i$} have unit $L^2$ norm, the coherence measure may be defined as:

$$\mu(A, B) = \max_{i,j} |\langle a_i, b_j \rangle|.$$

The number of compressive sensing measurements (i.e., samples of the sequence {$I_{MLS}(k)$} needed to reconstruct an N-pixel image (or N-voxel video sequence) that accurately represents the scene being captured is a strictly increasing function of the coherence between the measurement vector set and the sparsity vector set. Thus, better compression can be achieved with smaller values of the coherence. (The measurement vector set may also be referred to herein as the "measurement pattern set". Likewise, the sparsity vector set may also be referred to herein as the "sparsity pattern set".)

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc. (DCT is an acronym for Discrete Cosine Transform.)

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1–p of giving the value zero. (For example, in one embodiment p=½.) In some embodiments, the elements of each pattern are generated by a series of draws from a Gaussian random variable.)

The system 100 may be configured to operate in a compressive fashion, where the number of the samples {$I_{MLS}(k)$} captured by the system 100 is less than (e.g., much less than) the number of pixels in the image (or video) to be reconstructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different application domains, e.g., domains such as visible light photography, infrared photography, ultraviolet photography, high-speed photography, low-light photography, underwater photography, multi-spectral imaging, hyper-spectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may configured as a single integrated package, e.g., as a camera.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a sequence of images), e.g., by control unit 120. The light modulation unit may receive a light beam generated by the light source, and modulate the light beam with the image (or sequence of images) to obtain a modulated light beam. The modulated light beam exits the system 100 and is displayed on a display surface (e.g., an external screen).

In one embodiment, the light modulation unit 110 may receive the light beam from the light source and modulate the light beam with a time sequence of spatial patterns (from a measurement pattern set). The resulting modulated light beam exits the system 100 and is used to illuminate the external scene. Light reflected from the external scene in response to the modulated light beam is measured by a light sensing device (e.g., a photodiode). The samples captured by the light sensing device comprise compressive measurements of external scene. Those compressive measurements may be used to reconstruct an image or video sequence as variously described above.

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
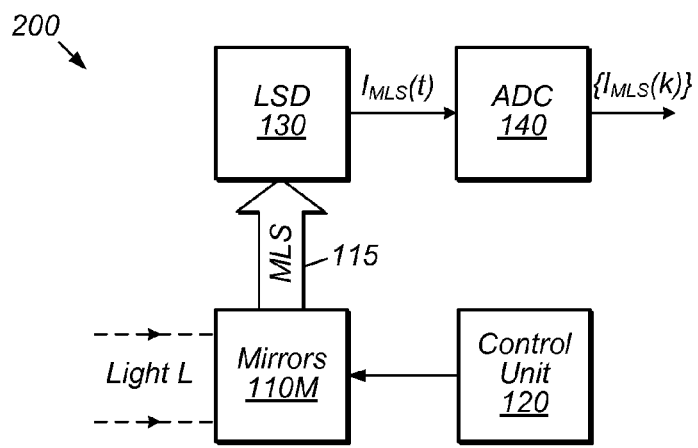
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between at least two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
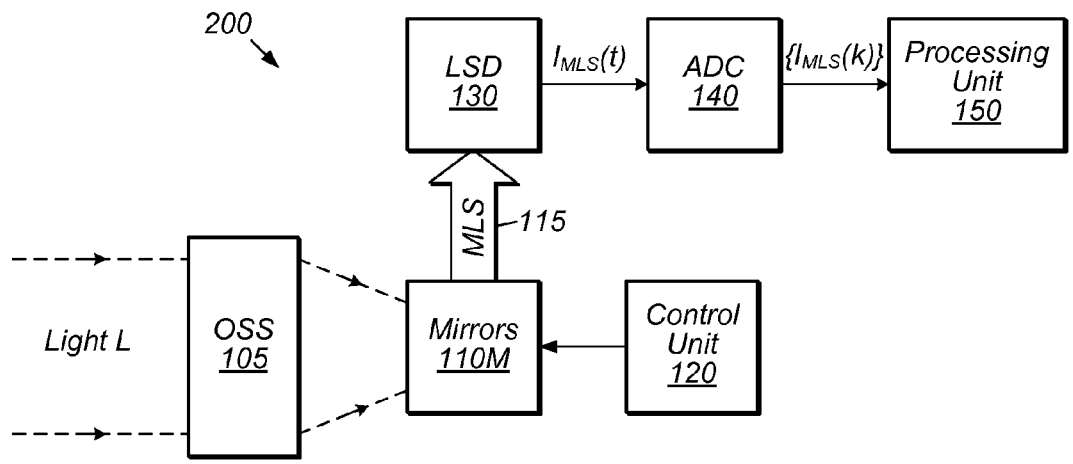
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
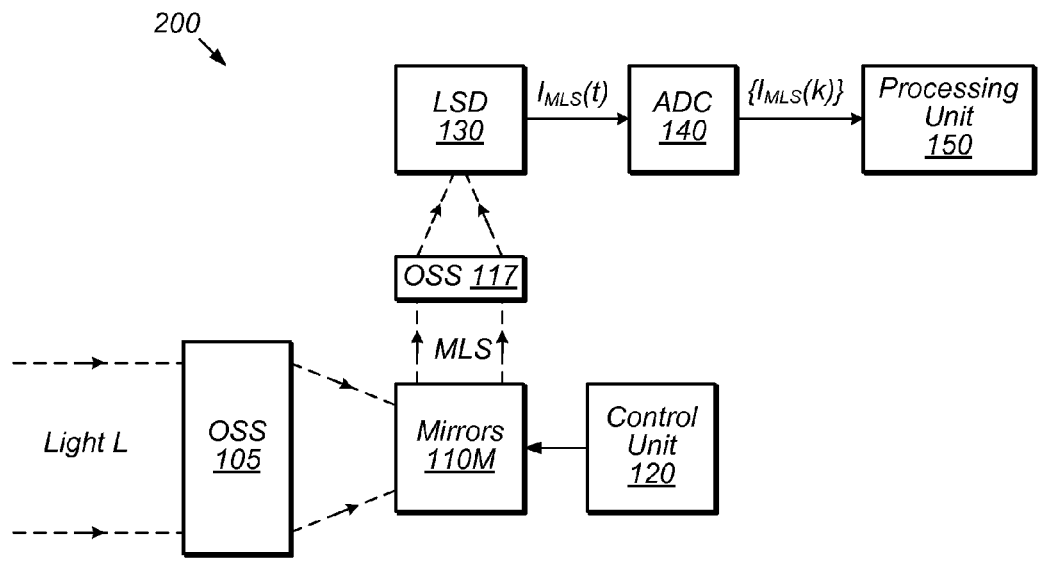
FIG. 4 shows an embodiment of system 200 that includes the optical subsystem 117 to direct or focus or concentrate the modulated light stream MLS onto the light sensing device 130.
Figure 5A:
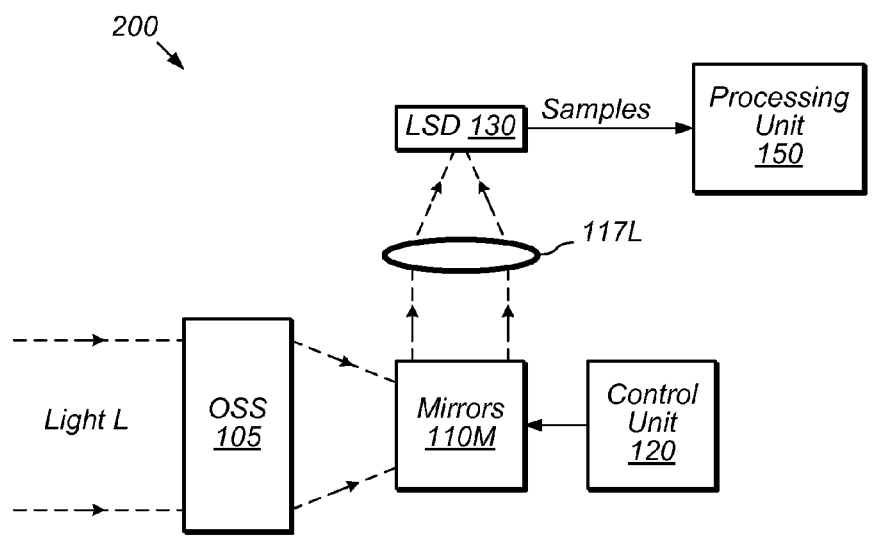
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
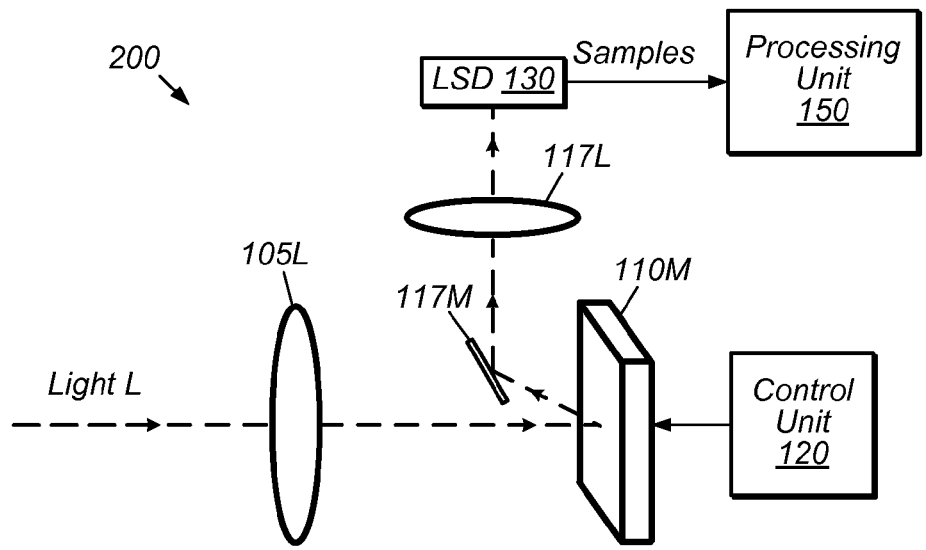
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
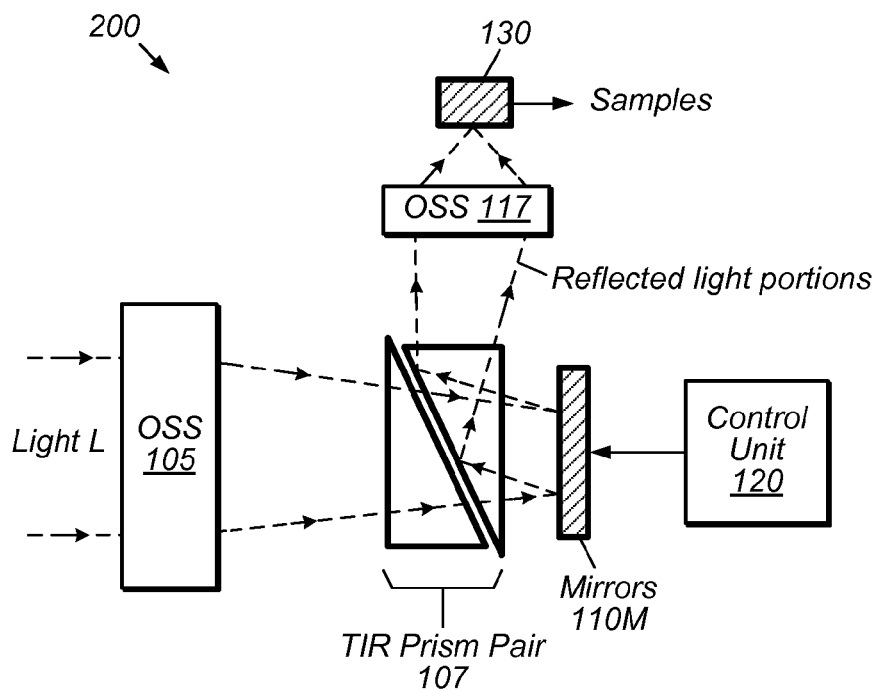
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Control of a Compressive Sensing System

Figure 6:
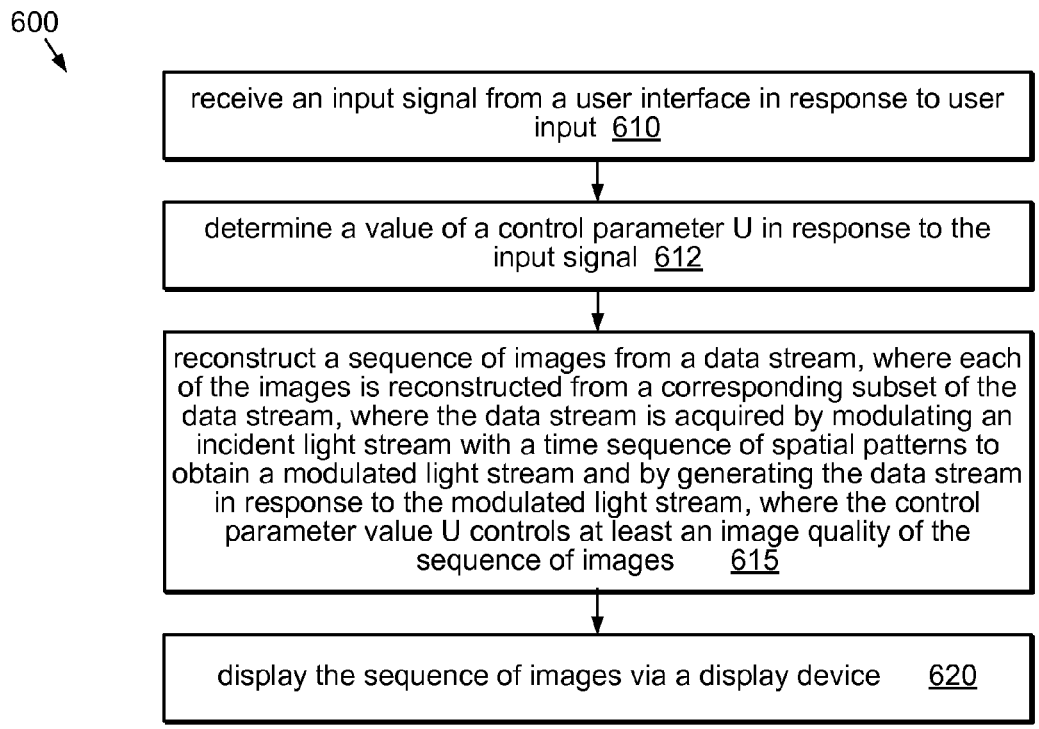
FIG. 6 illustrates one embodiment of a method that enables a user to control one or more visual performance factors associated with the image sequence reconstructed by a compressive imaging system.

In one set of embodiments, a method 600 may include the operations shown in FIG. 6. (Furthermore, method 600 may include any subset of the features, embodiments and elements described above in connection with system 100 and system realization 200, and described below in connection with method 650, system 700, method 800 and system 900.) Method 600 involves the reconstruction of a sequence of images from compressively-acquired measurements of a received light stream, and allows a user to control the image quality and/or frame rate of the reconstructed sequence of images.

At 610, an input signal is received from a user interface in response to user input. The input signal, the user interface and the user input may take any of various forms. For example, the user input may represent a user command to set or change the image quality. The user interface may include a mechanical input device such as a button, a slider, a joystick or a knob, and/or, one or more input elements of a graphical user interface (GUI). Various embodiments of the input signal, the user interface and user input are described below.

At 612, a value of a control parameter U is determined in response to the input signal. In some embodiments, a new value $U_k$ of the control parameter is determined based on the input signal and a previous value $U_{k-1}$ of the control parameter. For example, the control parameter may be updated according to the expression $$U_k = U_{k-1} + \Delta U,$$

where $\Delta U$ is determined by the input signal. In other embodiments, the value of the control parameter may be determined based on the input signal without reference to any existing value of the control parameter. For example, the control parameter value may be set according to the expression $U \leftarrow f(s)$, where $f(s)$ is a function of the input signal s.

At 615, a sequence of images is reconstructed from a data stream that is supplied as input. Each of the images is reconstructed from a corresponding subset of the data stream. The data stream is acquired by modulating an incident light stream with a time sequence of spatial patterns to obtain a modulated light stream and by generating the data stream in response to the modulated light stream. (The data stream may be generated by sensing the modulated light stream with a light sensing device, e.g., as variously described above.) The control parameter value U controls at least the image quality of the sequence of images, e.g., by controlling parameters of the modulation process and/or the data stream generation process and/or the reconstruction process. We refer to the control parameter value U as controlling "at least" the image quality because it may in some embodiments be used to control one or more other visual performance features (such as, e.g., frame rate). Various mechanisms for controlling the image quality are described below.

The sequence of images may be reconstructed using any of a wide variety of reconstruction algorithms known in the field of compressive sensing.

At 620, the sequence of images is displayed via a display device. The display device may display the images successively in time. The display device may be realized by any of a wide variety of display technologies. In different embodiments, the display device may be a computer monitor or a touchscreen display or a head-mounted display or a projector system or any combination of the foregoing.

The control parameter value U that has been determined in response to the input signal is preferably applied immediately. Thus, the user can immediately see the visual consequence of the user input (that he/she has supplied through the user interface) by observing the displayed image sequence. By simply trying different inputs to the user interface and observing their respective visual effects in the displayed image sequence, the user may easily learn how to manipulate the user interface to achieve a desired quality of visual performance.

The reconstruction process 615 and the display process 620 are preferably performed while the incident light stream is being modulated and while the data stream is being generated so that one or more variables of the modulation process and/or one or more variables of the data stream generation process may be controlled. In alternative modes of operation, the reconstruction process and the display process may be started after the modulation and data stream generation processes have completed. Thus, the reconstruction process is based on a data stream that has been previously acquired and stored into memory. The reconstruction process then accesses the data stream from the memory.

In some embodiments, the action 610 of receiving the input signal and the action 612 of determining the control parameter value U in response to the input signal may be repeated, e.g., continuously or periodically repeated whenever the user interface reports user interaction with the user interface. The image quality of the sequence of images may be dynamically adjusted in response to each change of the control parameter value U.

In some embodiments, the input signal may represent a user command to change (i.e., increase or decrease) the image quality, in which case the action 612 of determining the control parameter value U includes changing (i.e., increasing or decreasing) the control parameter value U in response to the input signal.

In some embodiments, the input signal may specify merely a direction to change the image quality. The control parameter value U may be incremented or decremented by a fixed step size based on the direction indicated by the input signal. In one embodiment, the control parameter value U may be continuously (e.g., periodically) incremented (decremented) by a fixed step size as long as the input signal indicates that an increase (decrease) of the image quality is being selected by the user. (The user interface may be configured to provide continuous input, i.e., input that is sampled at a sufficiently high rate so as to give the perception of continuous control.)

In one embodiment, the user interface may include a rocker button that admits rocking either right or left from a neutral state. Pressing on the right side of the button indicates a command to increase image quality, whereas pressing on the left side of the button indicates a command to decrease the image quality.

In one embodiment, the input signal may specify both a direction and magnitude of change. (For example, the above-described rocker button may measure the force of the button press, and incorporate that information into the input signal along with the directional information.) The control parameter value U is then changed in accordance with the specified direction and magnitude.

In one embodiment, the user interface may include a slider that the user can freely move along a one-dimensional range of control. In this case, the input signal may represent the instantaneous position of the slider along the range of control.

In some embodiments, the control parameter value U may control the image quality of the sequence of images by controlling one or more of the following: (1) a selection of a reconstruction algorithm to be used to perform the reconstruction of the sequence of images; (2) a number of reconstruction algorithms to be used to perform the reconstruction of the sequence of images; (3) whether or not an adaptive reconstruction algorithm is used to perform the reconstruction of the sequence of images; (4) a size of the subsets of the data stream used to reconstruct the corresponding images of the sequence of images; (5) whether or not active illumination is used to illuminate the scene under observation; (6) an extent of active cooling applied to a light sensing device that is used to acquire the data stream; (7) an extent to which oversampling and sample averaging are applied in the acquisition of the data stream; (8) a sampling rate of the A/D conversion device (or subsystem) that acquires the data stream. This list of options for controlling image quality is not meant to be exhaustive; (9) an integration time of a light sensing device that senses the modulated light stream; (10) one or more parameters of a reconstruction algorithm to be used to perform the reconstruction of the sequence of images; (11) a selection of one or more post-processing algorithms to apply to the sequence of images; (12) one or more parameters of one or more post-processing algorithms to be applied to the sequence of images.

(1) Some reconstruction algorithms may reconstruct the sequence of images with higher image quality than others, e.g., at the expense of a larger amount of computational effort per image. A set of two or more reconstruction algorithms may be linearly ordered according to image quality, and the control parameter value U may be used to select one of reconstruction algorithms from the ordered set. The selected algorithm is then used to perform the reconstruction of the sequence of images. In one embodiment, the control parameter value U may be used to select between the TVAL algorithm and the CoSAMP algorithm. TVAL3 is an acronym for Total Variation minimization by Augmented Lagrangian and ALternating direction ALgorithms. CoSAMP is an acronym for Compressive Sampling Matching Pursuit.

(2) Image quality may be enhanced by executing N different reconstruction algorithms on the data stream to obtain N corresponding sequences of images, where N≥2, and then selecting the best or combining two or more of the N images sequences to obtain an improved image sequence. (The best image sequence may be determined, e.g., by measuring a signal-to-noise ratio for each of the N image sequences and selecting the one with the highest SNR.) The improved image sequence may then be displayed. In one embodiment, the N image sequences may be averaged on a frame by frame basis to obtain the improved image sequence. Averaging tends to reduce zero-mean noise. Examples of reconstruction algorithms that may be employed include any of various matching pursuit algorithms, iterative thresholding algorithms, model-based reconstruction algorithms, etc.

(3) A reconstruction algorithm reconstructs the image sequence given (A) the time sequence of spatial patterns used to modulate the incident light stream and (B) the data stream generated (by the light sensing device) in response to the modulated light stream. In some embodiments, the spatial patterns are determined independently of the data stream or information derived from the data stream. In other embodiments, the spatial patterns are determined at least in part by the data stream or information derived from the data stream. For example, a reconstruction algorithm may be configured to provide realtime feedback information while it reconstructs the image sequence. The feedback information may be used to control the realtime selection of the spatial patterns being applied to the incident light stream in order to increase the efficiency of the image acquisition process and/or the reconstruction process, e.g., to decrease the number of spatial patterns required to encode the images of the image sequence. Such a reconstruction algorithm is referred to herein as being "adaptive". Use of an adaptive reconstruction algorithm instead of a non-adaptive reconstruction algorithm is one way to improve image quality. The control parameter value U may be used to select between an adaptive reconstruction algorithm and a non-adaptive reconstruction algorithm, e.g., by comparing the control parameter value U to a threshold.

In some embodiments, system 100 (e.g., processing unit 150 or control unit 120) may start the modulation process by applying spatial patterns from a given measurement pattern set. Then, after the reconstruction algorithm has reconstructed one or more images of the image sequence, it generates a set of indices $\{i1, i2, \ldots, iK\}$ of the sparsity pattern set $\{v_i\}$. The set of indices identifies which patterns in the sparsity pattern set contain a high percentage of the energy of the one or more images. The index set may be used to select one or more patterns to be injected into the time sequence of spatial patterns for a next image acquisition period. In one embodiment, system 100 (e.g., control unit 120 or processing unit 150) may select the patterns from the sparsity pattern set that are specified by the index set, i.e., patterns $v_{i1}, v_{i2}, \ldots, v_{iK}$, and inject those patterns into the time sequence of spatial patterns, and then continue by injecting patterns from the measurement vector set. If the image sequence is continuous in time, the sparsity index set may also be continuous in time.

Thus, the injection of patterns $v_{i1}, v_{i2}, \ldots, v_{iK}$ may enable the system 100 to quickly capture a significant percentage of the energy present in the next image of the image sequence (i.e., the next image carried by the incident light stream).

In other embodiments, the set of indices {i1, i2, ..., iK} may identify which patterns in the sparsity pattern set contain a high percentage of the information of interest in one or more images. The information of interest may be determined in any of a wide variety of ways, using any of a wide variety of measures of information content. As above, the index set may be used to select one or more patterns to be injected into the time sequence of spatial patterns for a next image acquisition period. In one embodiment, system 100 (e.g., control unit 120 or processing unit 150) may select the patterns from the sparsity pattern set that are specified by the index set, i.e., patterns $v_{i1}, v_{i2}, \ldots, v_{iK}$, and inject those patterns into the time sequence of spatial patterns, and then continue by injecting patterns from the measurement vector set. If the image sequence is continuous in time, the sparsity index set may also be continuous in time. Thus, the injection of patterns $v_{i1}, v_{i2}, \ldots, v_{iK}$ is likely to capture a significant percentage of the information of interest in the next image of the image sequence (i.e., the next image carried by the incident light stream).

(5) In some embodiments, a light source may be used to actively illuminate the scene under observation. The use of active illumination may improve image quality, especially when ambient illumination is weak. For example, at night there might not be enough ambient illumination to acquire high quality images. The control parameter value U may be used (e.g., in combination with a measurement of ambient illumination level) to determine whether or not to turn on the active illumination.

(6) As variously described above, a light sensing device such as light sensing device 130 may convert the modulated light stream MLS into one or more electrical signals. (For example, the light sensing device may generate exactly one electrical signal representing intensity of the modulated light stream over time. As another example, the light sensing device may generate a plurality of electrical signals representing corresponding spatial portions of the modulated light stream.) The one or more electrical signals may be sampled by an A/D conversion subsystem to generate the data stream. See, e.g., A/D converter 140 described above in connection with system 100. The light sensing device may be actively cooled in order to decrease noise in the one or more electrical signals. Decreased noise implies more accurate measurements of the modulated light stream, and thus, improved quality of the reconstructed image sequence. Thus, in some embodiments, the control parameter value U may be used to determine whether or not to turn on the active cooling device, or, to determine an extent of active cooling to be applied. For example, the active cooling device may admit a continuous range of control.

(7) In some embodiments, the A/D conversion subsystem may oversample the one or more electrical signals, i.e., acquire samples of the one or more electrical signals at a rate that is higher than (e.g., a multiple of) the pattern modulation rate. The pattern modulation rate is the rate at which the spatial patterns are applied to the incident light stream L. Thus, the A/D conversion subsystem may generate a plurality of samples per electrical signal per spatial pattern. The plurality of samples may be averaged to obtain a single averaged sample per electrical signal per spatial pattern. The averaging tends to reduce noise, and thus, to increase quality of image reconstruction. The control parameter value U may be used to determine whether or not oversampling and sample averaging are employed, or to determine an extent to which oversampling and sample averaging are employed. The oversampling ratio may be controlled by setting the pattern modulation rate and/or by setting the A/D sampling rate. The oversampling ratio is the ratio of the sampling rate to the pattern modulation rate.

For more information on the subject of oversampling and sample averaging, please refer to U.S. patent application Ser. No. 13/207,258, filed on Aug. 10, 2011, entitled "Techniques for Removing Noise in a Compressive Imaging Device", which is hereby incorporated by reference in its entirety.

(8), (9): As described variously above, the data stream is acquired by sensing the modulated light stream with a light sensing device and sampling the signal(s) generated by a light sensing device. The sampling rate of the A/D conversion device may have an influence on image quality because the sampling period (the inverse of the sampling rate) determines the maximum amount of time the light sensing device can integrate photo-induced charge before being sampled. A larger integration time may in some contexts increase the signal-to-noise ratio of the acquired samples, and thus, improve image quality. Thus, in some embodiments, the control parameter value U may be used to control the integration time of the light sensing device and/or the sampling rate of the A/D conversion device.

(10) As described above, the control parameter value U may be used to control one or more parameters of a reconstruction algorithm to be used to perform the reconstruction of the images of the image sequence. Examples of such reconstruction algorithm parameters include: the number of optimization iterations; iteration exit criteria; optimization constraints; one or more noise threshold scale factors; residual tolerance factors; and the inclusion or modification of a transform weighting matrix in the reconstruction algorithm.

(11) As described above, the control parameter value U may be used to control a selection of one or more post-processing algorithms to apply to the sequence of images. Examples of post-processing algorithms that may be applied include: a histogram equalization algorithm, an image sharpening algorithm; an image smoothing algorithm; a contrast adjustment algorithm; a uniformity correction algorithm; a pseudocolor mapping algorithm.

(12) As described above, the control parameter value U may be used to control one or more parameters of one or more post-processing algorithms to be applied to the sequence of images. Examples of such algorithmic parameters include pixel gray level values and bit-depth and their distribution over the available image dynamic range.

In some embodiments, the input signal includes a first component and a second component. (For example, the user interface may include a two-dimensional input device or two one-dimensional input devices.) In these embodiments, the action 612 of determining the value of the control parameter U may include determining the value of the control parameter U based on the first component of the input signal. Furthermore, the method 600 may also include determining a value of a control parameter V based on the second component of the input signal. The control parameter value V may control another aspect of visual performance such as the frame rate of the sequence of images. (The frame rate may be interpreted as the rate at which the images of the image sequence are displayed.) Various mechanisms for controlling frame rate are described below.

In one embodiment, the first component of the input signal indicates a direction to change the image quality and the second component of the input signal indicates a direction to change the frame rate. For example, the user interface may include a button that allows a user to rock the button up, down, right or left from a neutral state. Pressing on the right (left) side of the button indicates a user command to increase (decrease) the image quality. Pressing on the top (bottom) side of the button indicates a user command to increase (decrease) the frame rate. Pressing on the northeast (top right) portion of the button indicates a user command to increase both image quality and frame rate, and so on. In another embodiment, the first and second components include both magnitude and direction information. For example, the rocker button may be configured to measure the force of the button press in each of the four directions (up, down, right, left), and incorporate that magnitude information into the input signal along with the directional information. In yet another embodiment, the first component determines the value of the control parameter U, and the second component determines the values of the control parameter V, e.g., according to the expressions:

$$U \leftarrow f(x)$$

$$V \leftarrow g(y),$$

where x represents the first component, y represents the second component, and f and g are predetermined functions.

In various embodiments, the control parameter value V controls the frame rate of the image sequence by controlling one or more of the following: (a) a number of superpixels into which the spatial patterns are partitioned; (b) a size of a spatial subset to which the spatial patterns are restricted; (c) a size of the subsets of the data stream used to reconstruct corresponding images of the image sequence; (d) an extent of overlap between consecutive pairs of the subsets of the data stream; (e) a sampling rate of an analog-to-digital conversion device that acquires the data stream; (f) an integration time of a light sensing device that senses the modulated light stream. This list of options for controlling frame rate is not meant to be exhaustive.

(a) A superpixel is a cell of light modulating elements (on the light modulation unit 110) that are constrained to operate in unison, e.g., constrained so that all the elements of the cell take the same modulation state, although that common state may vary in time. The array of light modulating elements may be constrained to form an array of superpixels at lower spatial resolution by appropriately constraining the spatial patterns being supplied to the light modulation unit 110. For more information on the use of superpixels, see the section above entitled "Superpixels for Modulation at Lower Spatial Resolution". The number of compressive measurements (samples of the data stream) required to reconstruct each image of the image sequence with given accuracy decreases as the number of superpixels decreases, i.e., as the size of the superpixels increases. Also, the reconstruction time per image decreases as the number of superpixels decreases because the reconstruction algorithm generates each image with only one image pixel per superpixel. Thus, frame rate may be increased by decreasing the number of superpixels (i.e., increasing the size of the superpixels). In some embodiments, the control parameter value V is used to control the number of superpixels. For example, the number of superpixels may be decreased as the control parameter value V increases.

(b) For information on how to control frame rate by spatial pattern restriction, see the section above entitled, "Restricting the Spatial Patterns to a Subset of the Modulation Array". The number of compressive measurements (samples of the data stream) required to reconstruct each image of the image sequence with given accuracy decreases as the size of the subset decreases. (The size of the subset may be measured in terms of the number of light modulating elements that are covered by the subset.) Furthermore, the reconstruction time per image decreases as the size of the subset decreases because the reconstruction algorithm need only reconstruct pixels corresponding to the interior of the subset. The control parameter value V may be used to control the size of the subset. For example, the size of the subset may be decreased as the control parameter value V increases.

(c) When the image sequence is reconstructed from the data stream, each image of the image sequence may be reconstructed from a corresponding subset (i.e., sample block) of the data stream. The subsets may overlap in time. For a fixed percentage of overlap between successive subsets and a fixed A/D sampling rate, the rate at which subsets become available for reconstruction is determined by the size of the subsets. Thus, the frame rate may be determined at least partially by the size of the data stream subsets. The control parameter value V may be used to control the size of the data stream subsets. For example, the subset size may be decreased as the control parameter value V increases.

(d) In some embodiments, the percentage overlap between successive data stream subsets may be used to control the frame rate. For a fixed size of the subsets and a fixed A/D sample rate, the rate at which the subsets become available for reconstruction is determined by the percentage overlap. For example, if each subset includes 10000 samples, and each successive pair of subsets have 5000 samples of overlap, the sample subsets become available at rate equal to $\frac{1}{5000}$ times the sample rate. However, if one increases the amount of overlap to 9000 samples, the sample subsets become available at $\frac{1}{1000}$ times the sample rate. Thus, the frame rate may be determined at least partially by the amount of overlap between successive data stream subsets. The control parameter value V may be used to determine the amount of overlap or percentage overlap between successive data stream subsets. For example, the amount (or percentage) of overlap may be increased as the control parameter value V increases.

(e) As described variously above, the data stream is acquired by sensing the modulated light stream with a light sensing device and sampling the signal(s) generated by a light sensing device. Furthermore, each of the images of the image sequence is reconstructed from a corresponding subset of the data stream. The time required to acquire the subset depends on the sample rate of the A/D conversion device and the size of the subset. If the subsets are of fixed size, the rate at which the datastream subsets become available for reconstruction increases as the sample rate increases. Thus, the frame rate may be increased (decreased) by increasing (decreasing) the sampling rate.

(f) Because the sampling period (the inverse of the sampling rate) is greater than the integration time of the light sensing device, the integration time also has an affect on the frame rate. The frame rate may be controlled by adjusting the integration time based on the control parameter value V.

In some embodiments, the control parameter value U and the control parameter value V define a control point in a two-dimensional (2D) control space. The user input may determine (or specify) a vector displacement of the control point in the 2D control space. The user input may determine the displacement in any of a wide variety of ways. For example, the user input may include a sliding motion of the finger on a touch screen, or a sliding motion of the finger on a touch sensitive pad, or a mouse click-and-drag movement, or a movement of a joystick, or a movement of a button that admits two-dimensional manipulation, or a pressing of any of the up, down, left and right arrow keys on a keypad.

In another embodiment (or mode of operation), the user input determines the position of the control point in the 2D control space. The user input may determine the control point position in any of a wide variety of ways. For example, the user input may include touching a touch screen at a desired position, or placing a mouse cursor at a desired position in a displayed 2D field and clicking, or entering coordinates of the control point via a numeric keypad, or selecting from a displayed list of previously used positions.

In some embodiments, the method 600 may include displaying at least a portion of the 2D control space, and displaying the control point within that portion of the 2D control space. (For example, the control space may be displayed as a rectangle.) Thus, the user is provided with visual feedback on the current position of the control point in the 2D control space.

In some embodiments, the method 600 may include dynamically updating the display of the control point as the user input is being supplied to the user interface by a user. For example, the display of the control point may be continuously updated while the user is dragging or otherwise moving the control point.

In some embodiments, the action 610 of receiving the input signal, the action of determining the control parameter value U, and the action of determining the control parameter value V may be repeated, e.g., continuously or periodically repeated whenever the user interface reports user interaction with the user interface. The image quality of the sequence of images may be dynamically adjusted in response to each change of the control parameter value U. The frame rate of the sequence of images may be dynamically adjusted in response to each change in the control parameter value V.

As described above, the control parameters U and V may be used in some embodiments to respectively control the image quality and the frame rate. However, it should be noted that the control parameter U and the control parameter V are not necessarily independent controls. In some embodiments, a change in the control parameter U may have an influence on the frame rate as well as the image quality. Likewise, a change in the control parameter V may have an influence on the image quality as well as the frame rate. For example, observe that the size of the data stream subsets appears in both the list of possible image quality control mechanisms and the list of possible frame rate control mechanisms. Increasing the size of the data stream subsets simultaneously increases image quality and decreases frame rate if the other control mechanisms are held constant. Likewise, decreasing the size of the data stream subsets simultaneously decreases image quality and increases frame rate if the other control mechanisms are held constant. Thus, in some embodiments, image quality and frame rate may be interpreted as opposing (or inversely related) visual performance factors.

In some embodiments, the control parameter U is used to control both the image quality and the frame rate, and the control parameter V is not used. The control parameter U may control the image quality and frame rate by controlling one or more of the image quality variables (1) through (12) described above, and/or, one or more of the frame rate variables (a) through (f) described above. In these embodiments, the user interface may be configured to generate a one-dimensional input signal in response to the user input. (See, e.g., FIG. 12B and the corresponding textual description.) The value of the control parameter U defines a control point in a one-dimensional (1D) control space. The input signal may specify a displacement (e.g., a 1D vector displacement) of the control point. Alternatively, the input signal may specify the position of the control point in the 1D control space.

In some embodiments, the control point and the 1D control space may be displayed so the user is provided with visual feedback on the current position of the control point. Furthermore, the display of the control point may be dynamically updated as the user input is being supplied to the user interface. However, in other embodiments, the control point and the 1D control space are not displayed.

In one embodiment, the control parameter U controls at least the size of the data stream subsets. For example, as the control parameter U increases (decreases), the size of the data stream subsets may be increased (decreased).

In some embodiments, the user interface includes a graphical user interface (GUI). The above-described input signal may be generated by the GUI. In one embodiment, the GUI includes a touchscreen interface. In other embodiments, the GUI includes a mouse-keyboard-display interface, or a trackpad-and-display interface.

In some embodiments, the user interface includes a mechanical input device configured to generate the input signal in response to the user input, where the user input is a two-dimensional user input, and the input signal is a two-dimensional input signal. For example, the mechanical input device may be a button or knob that allows simultaneous motions along an up-down dimension and a left-right dimension.

In some embodiments, the user interface includes a mechanical input device configured to generate the input signal in response to the user input, where the user input is a one-dimensional user input, and the input signal is a one-dimensional input signal. For example, the mechanical input device may be a button, knob or slider that allows movement along a single dimension or single axis. (See the slider of FIG. 12B.)

In some embodiments, the spatial patterns used to modulate the incident light stream are incoherent relative to a dictionary of 2D patterns in which images of the image sequence are compressible (or sparse). See the above discussion of the coherence.

In some embodiments, the action of generating (i.e., acquiring) the data stream includes converting the modulated light stream into a sequence of samples of intensity of the modulated light stream, e.g., as variously described above in connection with system 100 and system realization 200. The data stream may include the sequence of intensity samples. Each image of the image sequence may be reconstructed from a corresponding subset of the intensity samples. Each subset of the intensity samples corresponds to a respective subset of the spatial patterns. (In other words, the samples of each sample subset are captured in response to the application of the spatial patterns of the respective pattern subset to the incident light stream.) The number of spatial patterns in each spatial pattern subset may be less than (e.g., much less than) the number of pixels in the corresponding image of the image sequence.

In some embodiments, the action of generating the data stream includes converting $N_L$ spatial portions of the modulated light stream into $N_L$ respective sequences of intensity samples (where $N_L$ is greater than one), e.g., as variously described above, or, as variously described in U.S. application Ser. No. 13/197,304, filed on Aug. 3, 2011, entitled "Decreasing Image Acquisition Time for Compressive Imaging Devices", which is hereby incorporated by reference in its entirety. The data stream may include these sequences of intensity samples. The action of reconstructing each image $X_k$ of the image sequence $\{X_k\}$ may include reconstructing a plurality of subimages $X_{kj}$, $j=1, 2, \ldots, N_L$. Each subimage $X_{kj}$ represents a corresponding spatial portion of the field of view, and is reconstructed from a block $B_{kj}$ of samples from the $j^{th}$ sample sequence. The image $X_k$ may be formed by spatially concatenating the plurality of subimages $X_{kj}$, j=1, 2, . . . , $N_L$.

In some embodiments, the method 600 also includes receiving user input that specifies one or more regions within a field of view corresponding to the incident light stream. For example, a graphical user interface may be provided that allows the user to manually specify one or more bounding boxes within the field of view. The one or more specified regions may be used to modify the spatial patterns to be used in the modulation process. The modification of the spatial patterns may include nullifying (setting to zero) each of the spatial patterns within the one or more regions and leaving them unaltered outside the one or more regions. Thus, when the modified spatial patterns are used to modulate the incident light stream, portions of the incident light stream corresponding to the interior of the one or more regions do not reach the light sensing device. Only the exterior of the one or more regions is compressively measured by the light sensing device. The number of samples required to encode (capture) each image of the image sequence thus decreases because each image has effectively a smaller number of pixels. The frame rate may therefore be increased without loss of image quality. Furthermore, in the case where the one or more regions are excessively bright regions (e.g., regions corresponding to the sun or reflections of the sun), the ability to exclude the one or more regions from the field of view enables the dynamic range of the A/D conversion subsystem to be more effectively allocated to the desired signal information that resides external to the one or more regions. Thus, A/D quantization noise decreases, and the image quality of reconstructed image sequence increases.

In one alternative embodiment (or mode of operation), the modification of the spatial patterns may involve nullifying (setting to zero) the exterior of the one or more regions, and leaving the interior of the one or more regions unaltered. (The one or more regions may contain objects of interest to the user.) Thus, when the modified spatial patterns are used to modulate the incident light stream, portions of the incident light stream corresponding to the exterior of the one or more regions do not reach the light sensing device, and only the interior of the one or more regions is compressively measured.

In some embodiments, the method 600 may include receiving user input selecting one of a plurality of measurement pattern sets, where the spatial patterns used to perform the modulation of the incident light stream are drawn from the selected measurement pattern set. The selected measurement pattern set may be applied immediately to the modulation and reconstruction processes so that the user can immediately see the visual effect of the selected measurement pattern set by observing the displayed image sequence. By making successively different selections and observing the visual quality resulting from each selection, the user may easily identify the best measurement pattern set for the scene being observed.

In some embodiments, the method 600 may include receiving user input selecting one of a plurality of transformations to be used as the sparsifying transformation T during the reconstruction of the image sequence. More generally, the method 600 may include receiving user input selecting one of a plurality of dictionaries (vector sets) to be used as the sparsifying dictionary (i.e., the sparsity vector set) during the reconstruction of the image sequence. The selected dictionary may be applied immediately to the reconstruction process so that the user can immediately see the visual effect of the selected dictionary by observing the displayed image sequence. By making successively different selections and observing the visual quality resulting from each selection, the user may easily identify the best dictionary for the scene being observed.

In some embodiments, the method 600 may include receiving user input selecting one of a plurality reconstruction algorithms to be used for reconstructing the image sequence. The selected reconstruction algorithm may be applied immediately to the data stream, e.g., with seamless transition from the previously-used reconstruction algorithm, so that the user can immediately see the visual effect of the selected reconstruction algorithm by observing the displayed image sequence. By making successively different selections and observing the visual quality resulting from each selection, the user may easily identify the best reconstruction algorithm for the scene being observed.

As described above, method 600 may involve the acquisition and reconstruction of a sequence of images. In some embodiments, the images may be acquired in a continuous acquisition mode, wherein the images are acquired continuously with minimal delay between successive images. In other embodiments, the images may be acquired in a snapshot mode, where the user commands the acquisition of each image individually, e.g., by pressing a snapshot button.

Figure 6B:
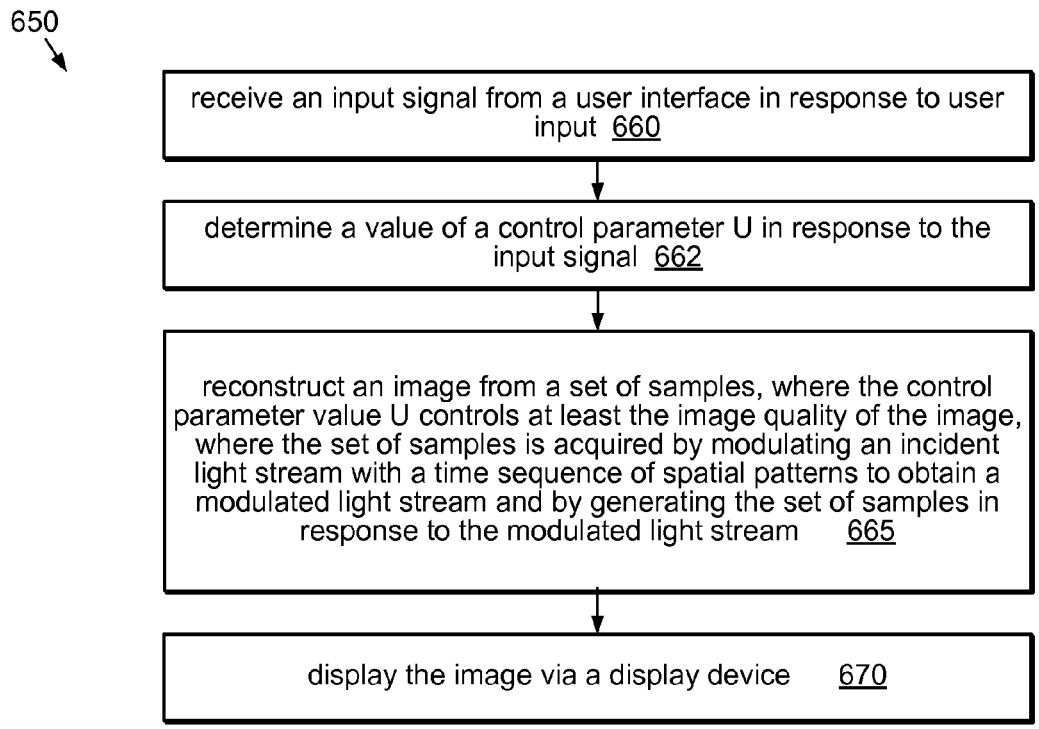
FIG. 6B illustrates one embodiment of a method that enables a user to control one or more visual performance factors associated with an image reconstructed by a compressive imaging system.

In one set of embodiments, a method 650 may include the operations shown in FIG. 6B. (Furthermore, method 650 may include any subset of the features, embodiments and elements described above in connection with system 100, system realization 200 and method 600 and described below in connection with system 700, method 800 and system 900.) Method 650 involves the reconstruction of an image from compressively-acquired measurements of a received light stream, and allows a user to control the image quality and/or latency (time until display) of the reconstructed image.

At 660, an input signal in received from a user interface in response to user input, e.g., as variously described above.

At 662, a value of a control parameter U is determined in response to the input signal, e.g., as variously described above.

At 665, an image is reconstructed from a set of samples. The control parameter value U controls at least the image quality of the image, e.g., as variously described above. The set of samples is acquired by modulating an incident light stream with a time sequence of spatial patterns to obtain a modulated light stream and by generating the set of samples in response to the modulated light stream.

At 670, the image is displayed via a display device, e.g., as variously described above.

In some embodiments, the input signal represents a user command to change the image quality, e.g., as variously described above. In these embodiments, the action 662 of determining the control parameter value U includes changing the control parameter value U in response to the input signal.

In some embodiments, the control parameter value U also controls a time delay between a request for acquisition of the image (e.g., when the user clicks the shutter button to initiate image acquisition) and the display of the image. The control parameter value U may control the time delay by controlling one or more of the following: (a) a number of superpixels into which the spatial patterns are partitioned; (b) a size of a subset to which the spatial patterns are restricted; (c) the number of samples in the set of samples; (d) a sampling rate of an analog-to-digital conversion device that acquires the data stream; (e) an integration time of the light sensing device that senses the modulated light stream.

In some embodiments, the input signal includes a first component and a second component, e.g., as variously described above. In these embodiments, the value of the control parameter U is determined based on the first component of the input signal, and the method 650 also includes determining a value of a control parameter V based on the second component of the input signal. The control parameter value V may be used to control the time delay between the request for acquisition of the image and the display of the image.

In some embodiments, the control parameter value V controls the time delay by controlling one or more of the following: (a) a number of superpixels into which the spatial patterns are partitioned; (b) a size of a subset to which the spatial patterns are restricted; (c) a number of samples in the set of samples; (d) a sampling rate of an analog-to-digital conversion device that acquires the data stream; (e) an integration time of a light sensing device that senses the modulated light stream.

In some embodiments, the control parameter value U controls image quality by controlling one or more of the following: (i) a selection of a reconstruction algorithm to be used to perform said reconstruction of the image; (ii) a number of reconstruction algorithms to be used to perform said reconstruction of the image; (iii) a number of samples in the set of samples; (iv) whether or not active illumination is used to illuminate the scene under observation; (v) an extent to which oversampling and sample averaging are applied in the acquisition of the data stream; (vi) a sampling rate of an analog-to-digital conversion device that acquires the data stream; (vii) an integration time of a light sensing device that senses the modulated light stream; (viii) one or more parameters of a reconstruction algorithm to be used to perform the reconstruction of the image; (ix) a selection of one or more post-processing algorithms to apply to the image; (x) one or more parameters of one or more post-processing algorithms to be applied to image.

Figure 7:
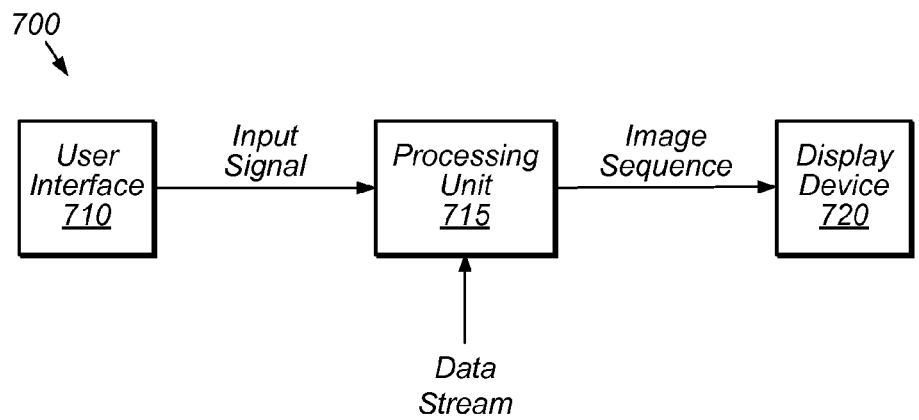
FIG. 7 illustrates one embodiment of a system that enables a user to control the visual performance of a compressive acquisition process and a reconstruction process.

In one set of embodiments, a system 700 may be configured as shown in FIG. 7. The system 700 may include a user interface 710 and a processing unit 715. Furthermore, system 700 may include any subset of the features, embodiments and elements described above in connection with system 100, system realization 200, method 600 and method 650 and described below in connection with method 800 and system 900.

The user interface 710 may be configured to generate an input signal in response to user input, e.g., as variously described above.

The processing unit 715 is configured to receive the input signal from the user interface, and determine a value of a control parameter U in response to the input signal, e.g., as variously described above. Furthermore, the processing unit is configured to reconstruct a sequence of images from a data stream supplied as input, to control at least an image quality of the sequence of images based on the control parameter value U, and to display the sequence of images using a display device 720, e.g., as variously described above. Each of the images is reconstructed from a corresponding subset of the data stream. The data stream is acquired by modulating an incident light stream with a time sequence of spatial patterns to obtain a modulated light stream and by generating the data stream in response to the modulated light stream. In some embodiments, the data stream may be acquired by system 100 as variously described above.

The processing unit 715 may be realized by one or more processors configured to execute program instructions stored in a memory, by one or more programmable hardware elements such as one or more FPGAs, by dedicated digital circuitry such as one or more ASICs, or by any combination of the foregoing. In one embodiment, the processing unit 715 includes a processor configured to execute program instructions stored in a memory. The program instructions, when executed by the processor, cause the processor to perform any subset of the operations described above in connection with method 600.

As described above in connection with FIGS. 2A-5C, system 100 may be realized as a camera. In some embodiments, user interface 710, processing unit 715 and display device 720 may be included as part of the camera. (In these embodiments, processing unit 715 may be included in processing unit 150 of system 100.) Alternatively, any one or more of those elements may be located remotely from the camera. For example, the user interface 710 may be located remotely from the camera while the processing unit 715 and display device 720 are included as part of the camera. Thus, the user interface may transmit the input signal (or information derived from the input signal) to the camera, e.g., via a wired or wireless connection or optical connection. As another example, the processing unit 715 may be located remotely from the camera, in which case the camera may transmit the acquired data stream to the processing unit 715 (or to a computer system containing the processing unit 715), e.g., via a wired or wireless connection or optical connection. As yet another embodiment, the display device 720 may be located remotely from the camera while the processing unit 715 is included as part of the camera, in which case the camera may transmit the reconstructed images to the display device, e.g., via a wired or wireless connection or optical connection.

In one embodiment, the user interface 710 may be included in a remote control unit, e.g., a handheld remote control unit.

In some embodiments, system 700 may be realized as a computer system. The computer system may receive the data stream from the system 100 as variously described above. In some embodiments, the computer system may include a transmitter to transmit control information to system 100. The control information may be determined by the user input. For example, the control information may include one or more of the following: a number (or size) of superpixels to be used when modulating the incident light stream; a specification of a subset of the modulation array to which the spatial patterns are to be restricted; a value indicating whether or not active illumination is to be used by the system 100; an extent of active cooling to be applied to the light sensing device; an extent of oversampling and/or sample averaging to be applied when acquiring the data stream; a sampling rate of an analog-to-digital conversion device that acquires the data stream; an integration time of a light sensing device that senses the modulated light stream.

In some embodiments, the user interface 710 is located remotely from a device that performs the modulation of the incident light stream, e.g., remotely from system 100 as described above.

In some embodiments, the user interface 710 is located remotely from the processing unit 715.

In some embodiments, the processing unit 715 is located remotely from the device that performs the modulation of the incident light stream, e.g., remotely from system 100 as described above.

In some embodiments, the display device 720 is located remotely from the processing unit 715.

In some embodiments, the user interface 710 and display device 720 are collocated or combined in an integrated unit.

In some embodiments, the processing unit 715 controls the image quality by controlling one or more of the following based on the control parameter value U: (1) a selection of a reconstruction algorithm to be used to perform said reconstruction of the image sequence; (2) a number of reconstruction algorithms to be used to perform said reconstruction of the image sequence; (3) whether or not an adaptive reconstruction algorithm is used to perform said reconstruction of the image sequence; (4) a size of the subsets of the data stream to be used to reconstruct corresponding frames of the image sequence; (5) whether or not active illumination is used to illuminate the scene under observation; (6) an extent of active cooling applied to a light sensing device that is used to acquire the data stream; (7) an extent to which oversampling and sample averaging is applied in the acquisition of the data stream; (8) a sampling rate of an analog-to-digital conversion device that acquires the data stream; (9) an integration time of a light sensing device that senses the modulated light stream; (10) one or more parameters of a reconstruction algorithm to be used to perform said reconstruction; (11) a selection of one or more post-processing algorithms to apply to the sequence of images; (12) one or more parameters of one or more post-processing algorithms to be applied to the sequence of images.

In some embodiments, the input signal (generated by the user interface 710) includes a first component and a second component, e.g., as variously described above. In these embodiments, the processing unit 715 is configured to determine the value of the control parameter U based on the first component of the input signal, determine a value of a control parameter V based on the second component of the input signal, and control a frame rate of the sequence of images based on the control parameter value V.

In some embodiments, the processing unit 715 is configured to control the frame rate by controlling one or more of the following based on the control parameter value V: (a) a number of superpixels into which the spatial patterns are partitioned; (b) a size of a subset to which the spatial patterns are restricted; (c) a size of the subsets of the data stream used to reconstruct corresponding images of the image sequence; and (d) an extent of overlap between subsets of the data stream used to reconstruct consecutive images of the image sequence; (e) a sampling rate of an analog-to-digital conversion device that acquires the data stream; (f) an integration time of a light sensing device that senses the modulated light stream.

Parameter values (a), (b), (e) and (f) may be supplied to the system 100 (e.g., to processing unit 150 or control unit 120). System 100 may generate the spatial patterns so that they conform to the specified parameter values. Parameter values (c) and (d) may be supplied to the reconstruction algorithm (e.g., to processing unit 715) to control how subsets of the data stream are to be assembled.

In a real-time mode, the processing unit 715 is configured to reconstruct and display the image sequence in real time while the incident light stream L is being modulated. Thus, the user is provided with immediate visual feedback on the effect of the user input.

In some embodiments, the processing unit 715 may be configured to repeat (e.g., continuously or periodically) the action of receiving of the input signal, the action of determining of the control parameter value U and the action of determining the control parameter value V, to allow changes to the control parameter value U and/or the control parameter value V. Furthermore, the processing unit 715 may be configured to dynamically adjust the image quality of the sequence of images in response to each change of the control parameter value U, and dynamically adjust the frame rate of the sequence of images in response to each change in the control parameter value V. Thus, the user is provided with immediate visual feedback on the effect of his/her changes. Therefore, the user is able to learn how to manipulate the user interface 710 simply by making changes (perhaps random at first) and observing their effects in the displayed image sequence.

The processing unit 715 may adjust the image quality of the image sequence by changing one or more of the above-described factors (1) through (12), and adjust the frame rate of the image sequence by changing one or more of the above-described parameters (a) through (f).

In some embodiments, the user interface 710 includes a graphical user interface (GUI) that generates the input signal in response to the user input, e.g., as variously described above. For example, the GUI may include a touchscreen interface.

In some embodiments, the user interface 710 includes a mechanical input device configured to generate the input signal in response to the user input, where the user input is a two-dimensional user input, and the input signal is a two-dimensional input signal, e.g., as variously described above.

In some embodiments, the system 700 is configured to continuously reconstruct the image sequence from the data stream with small latency and to immediately apply any user changes to the image quality and/or the frame rate. (The latency of reconstruction is the time between the presentation of a data stream subset and its corresponding subset of spatial patterns to the reconstruction process and the output of the corresponding reconstructed image from the reconstruction process.) Thus, the user may immediately observe the visual effects of his/her changes in the displayed image sequence. In these embodiments, it may not be necessary to display the control parameter value U and the control parameter value V (or any graphical indication of those values) because the user already has direct perception of the visual effects, which constitute more significant information than the values themselves. Indeed, in one embodiment, the system 700 is designed to not display the control parameter value U and the control parameter value V. In another embodiment, the system 700 is configured so that in its default configuration it does not display the control parameter value U and the control parameter value V, but turns on such a display when specifically requested by the user.

As described above, the processing unit 715 may be configured to control the image quality of the sequence of images based on the control parameter value U. In some embodiments, the processing unit 715 is configured to also control the frame rate of the sequence of images based on the control parameter value U, e.g., as variously described above. Thus, the control parameter value V may be omitted. In these embodiments, the input signal may be a one-dimensional input signal.

Figure 8:
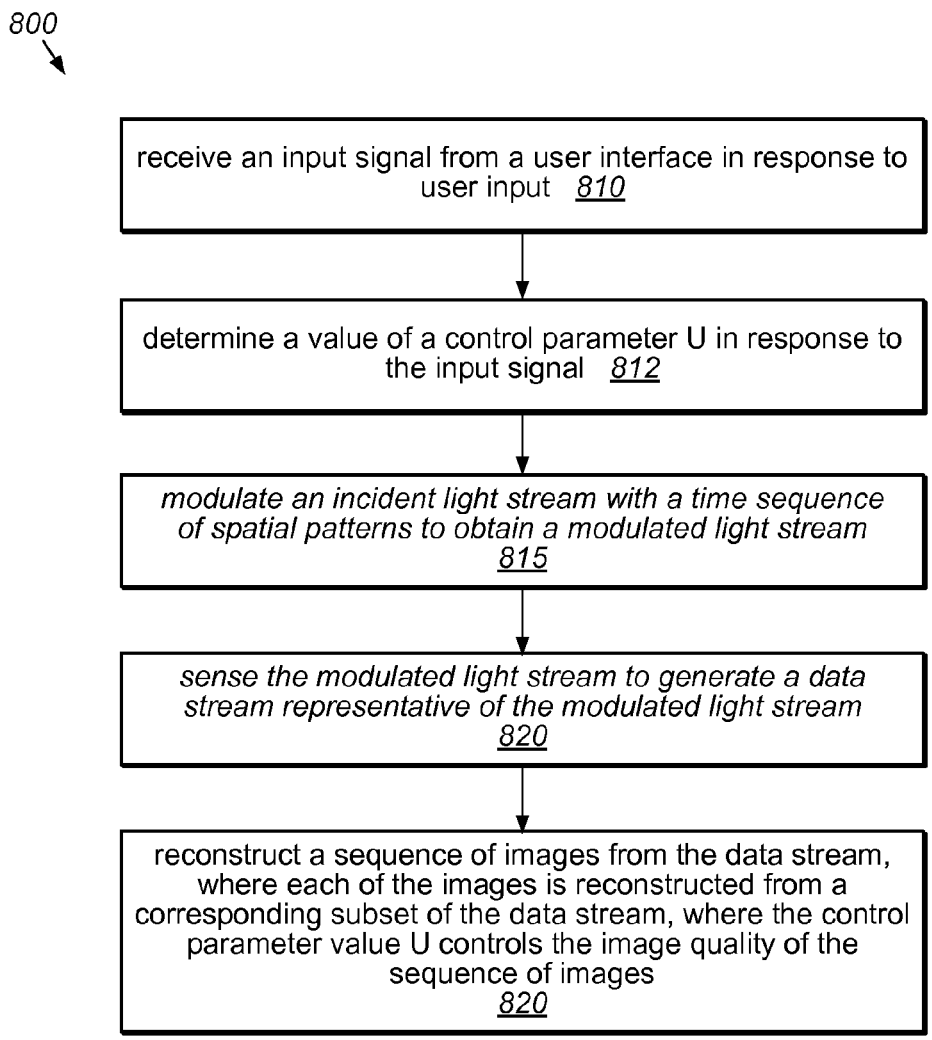
FIG. 8 illustrates one embodiment of a method that enables a user to control at least the image quality of a compressive acquisition process and a reconstruction process.

In one set of embodiments, a method 800 may include the operations shown in FIG. 8. Furthermore, method 800 may include any subset of the features, embodiments and elements described above in connection with system 100, system realization 200, method 600, method 650 and system 700, and described below in connection with system 900.

At 810, an input signal is received from a user interface in response to user input, e.g., as variously described above.

At 812, a value of a control parameter U is determined in response to the input signal, e.g., as variously described above.

At 815, an incident light stream is modulated with a time sequence of spatial patterns to obtain a modulated light stream, e.g., as variously described above in connection with system 100 and system realization 200.

At 820, the modulated light stream is sensed (e.g., with a light sensing device as variously described above) in order to generate a data stream representative of the modulated light stream.

At 825, a sequence of images is reconstructed from the data stream. Each of the images is reconstructed from a corresponding subset of the data stream. The control parameter value U controls at least the image quality of the sequence of images, e.g., as variously described above.

In some embodiments, the method 800 may also include displaying the image sequence through a display device, and repeating (e.g., continuously or periodically) the action 810 of receiving the input signal and the action 812 of determining the control parameter value U to allow changes to the control parameter value U. The above-described operations of modulating, sensing, reconstructing and displaying may be performed as a pipeline process, i.e., all the operations being performed simultaneously and each operation continuously consuming the output of the previous operation. The pipeline process may be continued until a termination condition is satisfied, e.g., until the user stops the process, or until battery supply in the camera runs low, or until a predetermined amount of time has transpired, etc. The image quality of the image sequence may be dynamically adjusted in response to each change of the control parameter value U, e.g., as variously described above.

In some embodiments, the control parameter value U controls the image quality by controlling one or more of the following: (1) a selection of a reconstruction algorithm to be used to perform the reconstruction of the image sequence; (2) a number of reconstruction algorithms to be used to perform the reconstruction of the image sequence; (3) whether or not an adaptive reconstruction algorithm is used to perform the reconstruction of the image sequence; (4) a size of the subsets of the data stream used to reconstruct corresponding images of the image sequence; (5) whether or not active illumination is used to illuminate the scene under observation; (6) an extent of active cooling applied to a light sensing device that is used to acquire the data stream; (7) an extent to which oversampling and sample averaging is applied in the acquisition of the data stream; (8) a sampling rate of an analog-to-digital conversion device that acquires the data stream; (9) an integration time of a light sensing device that senses the modulated light stream; (10) one or more parameters of a reconstruction algorithm to be used to perform the reconstruction; (11) a selection of one or more post-processing algorithms to apply to the sequence of images; (12) one or more parameters of one or more post-processing algorithms to be applied to the sequence of images.

In some embodiments, the input signal is a two-dimensional signal that includes a first component and a second component, in which case the control parameter value U is determined based on the first component, and, the method 800 also includes determining a value of a control parameter V based on the second component. The control parameter value V controls the frame rate of the sequence of images, e.g., as variously described above.

In some embodiments, the method 800 may also include: displaying the image sequence through a display device; and repeating the action 810 of receiving of the input signal, the action 812 of determining the control parameter value U and the action of determining the control parameter value V in order to allow changes to the control parameter value U and/or the control parameter value V. The above-described operations of modulating, sensing, reconstructing and displaying may be performed as a pipeline process. The image quality of the image sequence may be dynamically adjusted in response to each change of the control parameter value U, and the frame rate of the image sequence may be dynamically adjusted in response to each change of the control parameter value V, e.g., as variously described above. Thus, the user may intuitively learn how to operate the user interface simply by experimentation and observation of the displayed image sequence.

In some embodiments, the control parameter value V controls the frame rate by controlling one or more of the following: (a) a number of superpixels into which the spatial patterns are partitioned; (b) a size of a subset to which the spatial patterns are restricted; (c) a size of the subsets of the data stream used to reconstruct corresponding images of the image sequence; (d) an extent of overlap between consecutive ones of the subsets of the data stream; (e) a sampling rate of an analog-to-digital conversion device that acquires the data stream; (f) an integration time of a light sensing device that senses the modulated light stream.

In some embodiments, the control parameter value U and the control parameter value V define a control point in a two-dimensional (2D) control space. The input signal (received from the user interface) may determine a vector displacement (or change) of the control point in the 2D control space, e.g., as variously described above. Alternatively, the input signal may determine a position of the control point in the 2D control space, e.g., as variously described above.

In some embodiments, the control parameter value U may be used without the control parameter V. Thus, the value of the control parameter U defines a control point in a one-dimensional (1D) control space. The input signal (received from the user interface) may determine a 1D displacement (e.g., 1D vector displacement) of the control point in the 1D control space, e.g., as variously described above. Alternatively, the input signal may determine a position of the control point in the 1D control space, e.g., as variously described above.

In some embodiments, the method 800 may also include displaying at least a portion of the 2D control space, and displaying the control point within the portion of the 2D control space, e.g., as variously described above.

In some embodiments, the method 800 may also include dynamically updating the display of the control point as the user input is being supplied to the user interface.

In some embodiments, the user interface includes an input device that is responsive to two-dimensional input or two-dimensional vector input, e.g., as variously described above.

In some embodiments, the user interface includes a graphical user interface (GUI), e.g., as variously described above. The user input may be applied to the GUI.

In some embodiments, the spatial patterns used to modulate the incident light stream are incoherent relative to a dictionary of 2D patterns in which the images of the image sequence are compressible (or sparse).

In some embodiments, the action of sensing the modulated light stream includes converting the modulated light stream into a sequence of samples of intensity of the modulated light stream, e.g., as variously described above in connection with system 100 or system realization 200. The data stream may include the sequence of intensity samples. Each image of the image sequence may be reconstructed from a corresponding subset of the intensity samples whose sample size is smaller than the number of pixels in the image. (In some embodiments, the sample size of each sample subset may be counted in terms of the number of spatial patterns it spans.)

In some embodiments, the action of sensing the modulated light stream includes converting spatial portions of the modulated light stream into respective sequences of intensity samples, e.g., as variously described above. The data stream may include the sequences of intensity samples.

Figure 9:
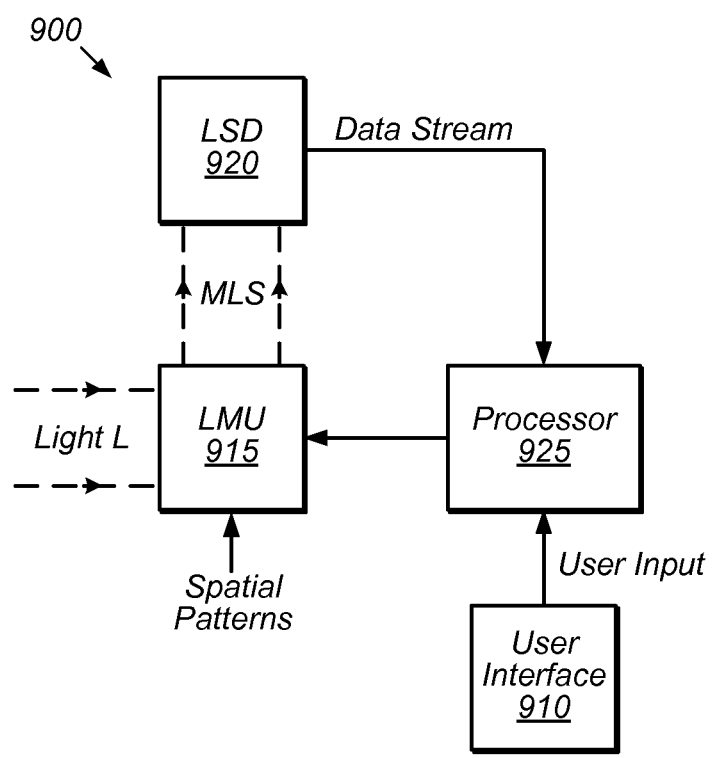
FIG. 9 illustrates one embodiment of a system that enables a user to control at least the image quality of a compressive acquisition process and a reconstruction process.

In one set of embodiments, a system 900 may be configured as shown in FIG. 9. System 900 may include a user interface 910, a light modulation unit 915, a light sensing device 920 and a processor 925. Furthermore, the system 900 may include any subset of the features, embodiments and elements described above in connection with system 100, system realization 200, method 600, method 650, system 700 and method 800.

The user interface 910 may be configured to generate an input signal in response to user input, e.g., as variously described above.

The light modulation unit 915 may be configured to modulate an incident light stream L with a time sequence of spatial patterns to obtain a modulated light stream MLS, e.g., as variously described above in connection with system 100 and system realization 200. In some embodiments, light modulation unit 915 may be realized by light modulation unit 110 or mirrors 110M.

The light sensing device 920 may be configured to sense the modulated light stream MLS in order to generate a data stream representative of the modulated light stream, e.g., as variously described above. In some embodiments, light sensing device 920 may be realized by light sensing device 130.

The processor 925 may be configured to execute program instructions stored in a memory. The program instructions, when executed by the processor, cause the processor to: receive the input signal from the user interface; determine a value of a control parameter U in response to the input signal; reconstruct a sequence of images from the data stream; and control at least an image quality of the sequence of images based on the control parameter value U, e.g., as variously described above.

In some embodiments, the system 900 may also include a display device configured to display the image sequence, e.g., as variously described above. Furthermore, the reconstruction of the image sequence may be performed in real time while the light modulation unit 915 is modulating the incident light stream.

In some embodiments, the processor 925 is further configured to: repeat (e.g., continuously or periodically) the action of receiving the input signal and the action of determining the control parameter value U, to allow changes to the control parameter value U; and dynamically adjust the image quality of the image sequence in response to each change of the control parameter value U, e.g., as variously described above. Thus, the user may observe the displayed image sequence, and immediately perceive how his/her user inputs affect the image quality of the image sequence.

In some embodiments, the processor 925 is configured to control the image quality by controlling one or more of the following based on the control parameter value U: (1) a selection of a reconstruction algorithm to be used to perform the reconstruction of the image sequence; (2) a number of reconstruction algorithms to be used to perform the reconstruction of the image sequence; (3) whether or not an adaptive reconstruction algorithm is used to perform the reconstruction of the image sequence; (4) a size of the subsets of the data stream used to reconstruct corresponding images of the image sequence; (5) whether or not active illumination is used to illuminate the scene under observation; (6) an extent of active cooling applied to a light sensing device that is used to acquire the data stream; (7) an extent to which oversampling and sample averaging is applied in the acquisition of the data stream; (8) a sampling rate of an analog-to-digital conversion device that acquires the data stream; (9) an integration time of a light sensing device that senses the modulated light stream; (10) one or more parameters of a reconstruction algorithm to be used to perform said reconstruction; (11) a selection of one or more post-processing algorithms to apply to the sequence of images; (12) one or more parameters of one or more post-processing algorithms to be applied to the sequence of images.

In some embodiments, the input signal is a two-dimensional input signal that includes a first component and a second component. In these embodiments, the control parameter value U may be determined based on the first component. Furthermore, the processor 925 determines a value of a control parameter V based on the second component, and controls the frame rate of the sequence of images based on the control parameter value V, e.g., as variously described above.

As described above, the system 900 may include a display device configured to display the sequence of images, and the reconstruction of the image sequence may be performed in real time while the light modulation unit is modulating the incident light stream. Furthermore, the processor 925 may be configured to: repeat the action of receiving the input signal, the action of determining of the control parameter value U and the action of determining the control parameter value V, to allow changes to the control parameter value U and/or the control parameter value V; dynamically adjust the image quality of the sequence of images in response to each change of the control parameter value U; and dynamically adjust the frame rate of the sequence of images in response to each change of the control parameter value V, e.g., as variously described above. Thus, the user may observe the displayed image sequence, and immediately perceive how his/her user inputs affect the image quality and the frame rate of the image sequence.

In some embodiments, the processor is configured to control the frame rate by controlling one or more of the following based on the control parameter value V: (a) a number of superpixels into which the spatial patterns are partitioned; (b) a size of a subset to which the spatial patterns are restricted; (c) a size of the subsets of the data stream used to reconstruct corresponding images of the image sequence; (d) an extent of overlap between consecutive ones of the subsets of the data stream; (e) a sampling rate of an analog-to-digital conversion device that acquires the data stream; (f) an integration time of a light sensing device that senses the modulated light stream.

In some embodiments, the user interface 910 includes an input device that is responsive to two-dimensional input or two-dimensional vector input, e.g., as variously described above.

In some embodiments, the user interface 910 includes a graphical user interface (GUI). For example, the GUI may include a touchscreen interface or a mouse-and-display interface or a mouse-keyboard-display interface or a touchpad-and-display interface.

In some embodiments, the light sensing device 920 is configured to sense the modulated light stream MLS by converting the modulated light stream into a sequence of samples of intensity of the modulated light stream, e.g., as variously described above. The data stream may include the sequence of intensity samples. Each image of the image sequence may be reconstructed from a corresponding subset of the intensity samples. Each subset of intensity samples may have a sample size that is smaller than the number of pixels in the corresponding image.

In some embodiments, the light sensing device 920 is configured to sense the modulated light stream by converting spatial portions of the modulated light stream into respective sequences of intensity samples. In these embodiments, the data stream includes the sequences of intensity samples.

In some embodiments, the user interface 910 may include one or more interface elements (e.g., GUI elements and/or mechanical input devices such as buttons, sliders, switches and knobs) for controlling one or more additional features. For example, the user interface 910 may be configured to receive user input to control one or more of the following: parameters of the optical input path of the camera such as focus, zoom, f-stop and exposure; integration period of the light sensing device; operation of a flash unit; and pan and/or tilt motions of the camera. (The integration period of the light sensing device is the period of time the light sensing device is allowed to integrate photo-induced electrons before being sampled. The integration period may be determine the A/D sample rate.)

Figure 10:
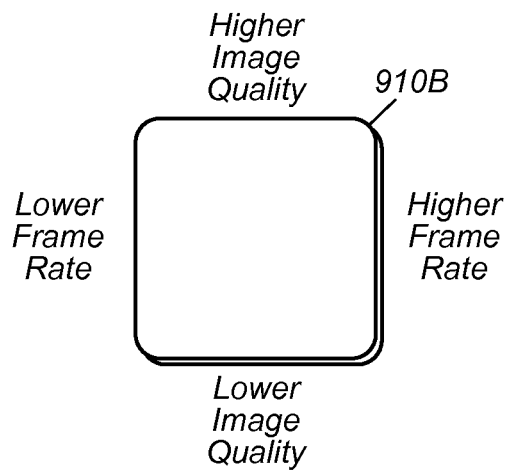
FIG. 10 illustrates one embodiment of a button that allows two-dimensional input so that a user may specify increases or decreases in image quality and/or frame rate.

In some embodiments, the user interface 910 may include a mechanical button 910B, e.g., as shown in FIG. 10. By pressing on the north side (south side) of the button, the user may increase (decrease) image quality. By pressing on the east side (west side) of the button, the user may increase (decrease) frame rate. Furthermore, by pressing on a corner of the button, the user may command simultaneous changes in both parameters. For example, by pressing on the north-east corner of the button, the user may simultaneously increase both image quality and frame rate. In some embodiments, system 900 may be configured as a camera, and the mechanical button may be mounted on the housing of the camera. With a little experimentation, the user will intuitively learn how to use the button by observing the real-time visual feedback provided by the system 900. Because the self-learning process is simple and intuitive, the button can be provided without documentation on the specific algorithmic mechanisms used to affect the changes in visual performance.

Figure 11:
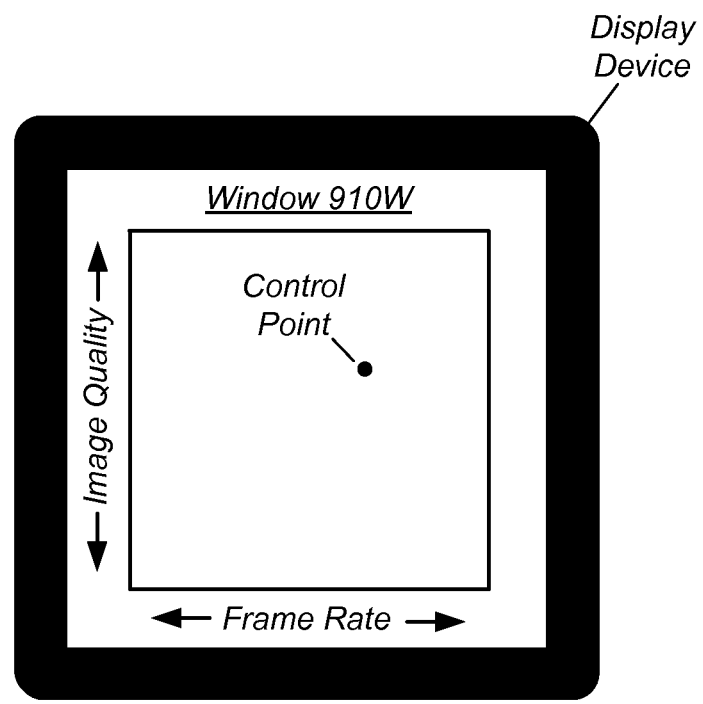
FIG. 11 illustrates one embodiment of a displayed window showing a control point in a control space, where the control point represents current values for image quality and frame rate.

In some embodiments, the user interface 910 may include a window 910W that is displayed on a display device, e.g., as shown in FIG. 11. The window 910W may display a control point representing the current selections for image quality and frame rate within a two-dimensional control space. In a touchscreen embodiment, the user may touch and drag the control point with a finger to specify new selections for the image quality and frame rate. In another embodiment, the user may move the control point by clicking and dragging the control point with a mouse. In another embodiment, the user may press on the button 910B of FIG. 10, and the control point moves in response that pressing action.

It should be understood that different combinations of the image quality and frame rate have different impacts on visual performance and power consumption. The best visual performance and highest power consumption occurs when the user selects the highest image quality and the highest frame rate. (This selection pair corresponds to the upper right corner of the control space shown in FIG. 11.) The worst visual performance and lowest power consumption occurs when the user selects the lowest image quality and the lowest frame rate. (This selection pair corresponds to the lower left corner of the control space shown in FIG. 11.)

Figure 12:
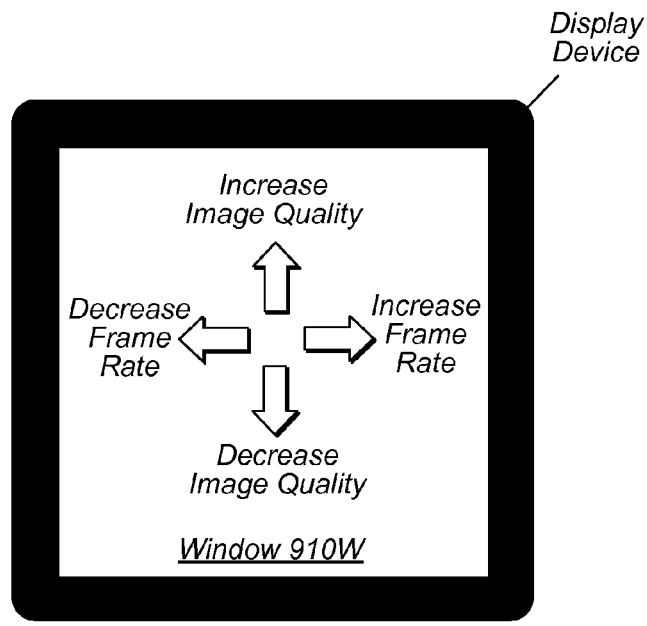
FIG. 12 illustrates one embodiment of a graphical user interface through which a user may specify increases or decreases in image quality and/or frame rate.

In some embodiments, the user interface 910 may include one or more GUI control elements such as buttons or sliders. For example, FIG. 12 shows an embodiment where window 910W displays four arrow elements. Each element may be pressed to induce a change in image quality or frame rate. The right arrow (left arrow) may be pressed to increase (decrease) the frame rate. The up arrow (down arrow) may be pressed to increase (decrease) image quality.

Figure 12B:
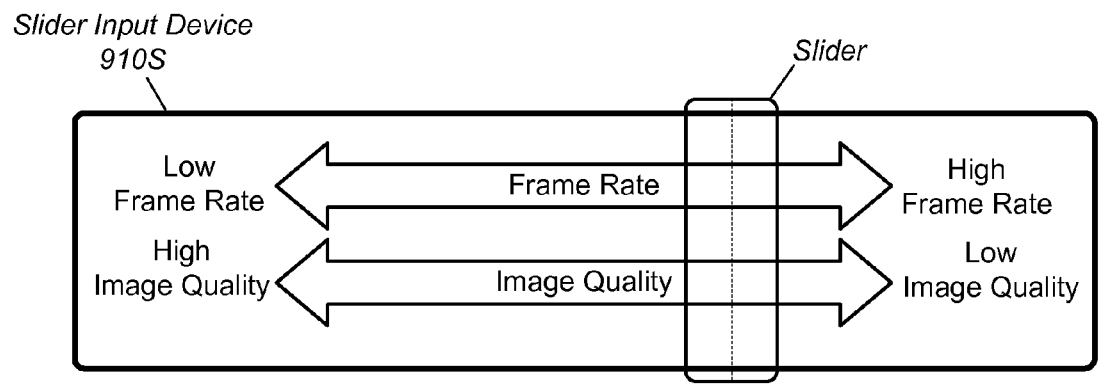
FIG. 12B illustrates one embodiment of a one-dimensional input device including a slider.

In these embodiments, the user interface 910 may be configured to generate a one-dimensional input signal in response to the user input. For example, the user interface may include a one-dimensional slider device 910S as shown in FIG. 12B. Note that increasing frame rate is associated with decreasing image quality, and increasing image quality is associated with decreasing frame rate. The input signal generated by the user interface may represent the position of the slider along the one-dimensional range of movement.

The principles of the present invention are not limited to light. Various embodiments are contemplated where the signals being processed are electromagnetic waves or particle beams or seismic waves or acoustic waves or surface waves on a boundary between two fluids or gravitational waves. In each case, a space-time signal is directed to an array of signal-modulating elements whose transmittances or reflectances are individually varied so as to modulate the space-time signal with a time sequence of spatial patterns. The modulated space-time signal may be sensed by a transducer to generate an electrical signal that represents intensity of the modulated space-time signal as a function of time. The electrical signal is sampled to obtain measurements. The measurements may be processed as variously described above to reconstruct the image or image sequence carried by the original space-time signal.

Compressive Imaging System 1300

Figure 13:
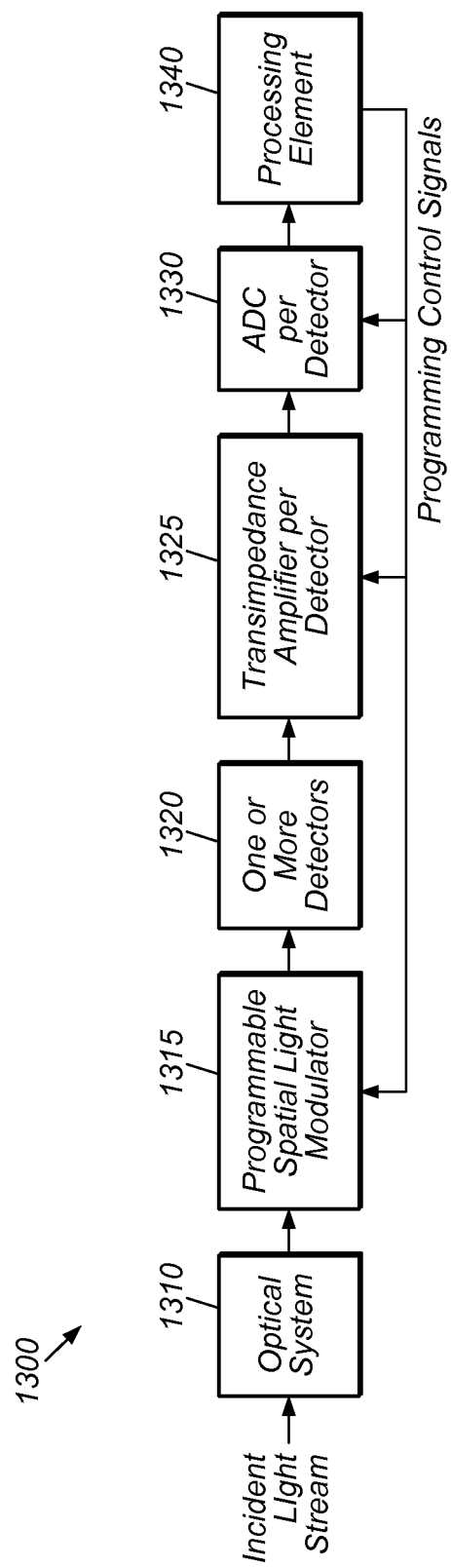
FIG. 13 illustrates one embodiment of a compressive imaging system 1300 including one or more detector channels.

In one set of embodiments, a compressive imaging system 1300 may be configured as shown in FIG. 13. The compressive imaging (CI) system may include an optical system 1310, a spatial light modulator 1315, a set 1320 of one or more photodetectors, a set 1325 of one or more amplifiers (i.e., one amplifier per detector), a set 1330 of analog-to-digital converters (one ADC per detector), and a processing element 1340.

The optical system 1310 focuses an incident light stream onto the spatial light modulator 1315, e.g., as variously described above. See the discussion above regarding optical subsystem 105. The incident light stream carries an image (or a spectral ensemble of images) that is to be captured by the CI system in compressed form.

The spatial light modulator 1315 modulates the incident light stream with a sequence of spatial patterns to obtain a modulated light stream, e.g., as variously described above.

Each of the detectors 1320 generates a corresponding electrical signal that represents the intensity of a corresponding portion of the modulated light stream, e.g., a spatial portion or a spectral portion of the modulated light stream.

Each of the amplifiers 1325 (e.g., transimpedance amplifiers) amplifies the corresponding detector signal to produce a corresponding amplified signal.

Each of the ADCs 1330 acquires samples of the corresponding amplified signal.

The processing element 1340 may operate on the sample sets obtained by the respective ADCs to reconstruct respective images. The images may represent spatial portions or spectral slices of the incident light stream. Alternatively, or additionally, the processing element may send the sample sets to a remote system for image reconstruction.

The processing element 1340 may include one or more microprocessors configured to execute program instructions stored in a memory medium.

The processing element 1340 may be configured to control one or more other elements of the CI system. For example, in one embodiment, the processing element may be configured to control the spatial light modulator 1315, the transimpedance amplifiers 1325 and the ADCs 1330.

The processing element 1340 may be configured to perform any subset of the above-described methods on any or all of the detector channels.

Compressive Imaging System 1400

Figure 14:
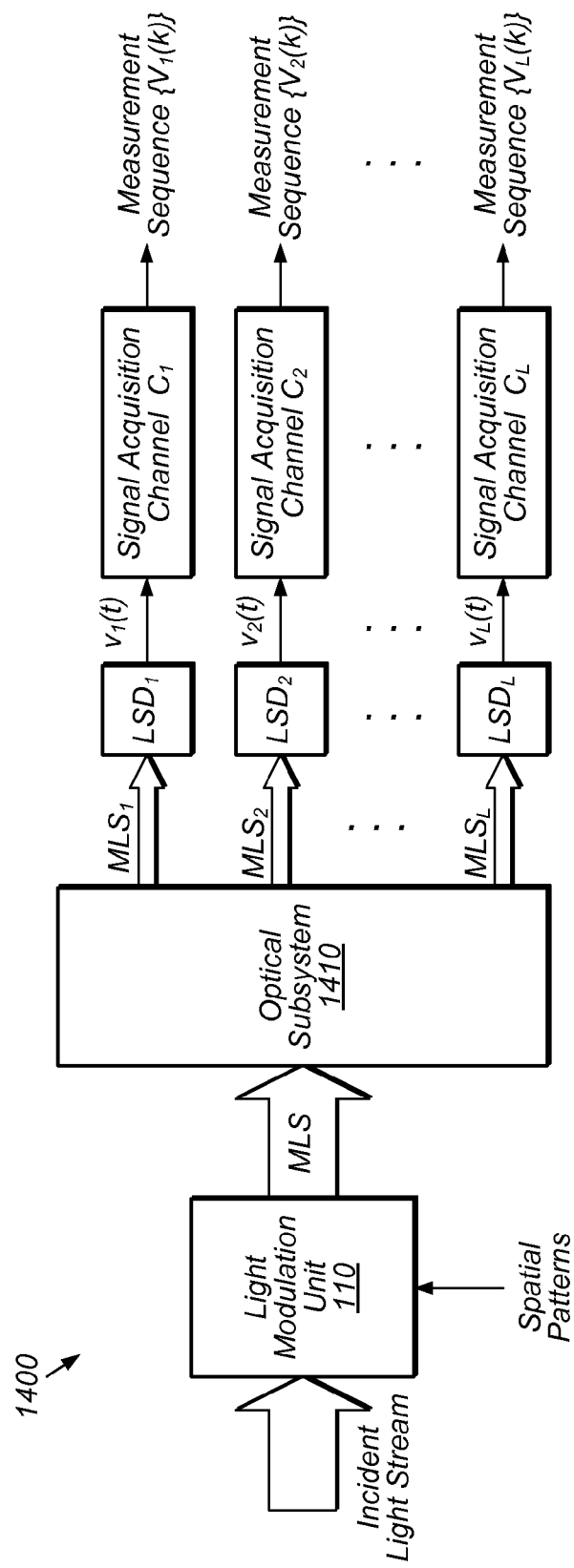
FIG. 14 illustrates one embodiment of a compressive imaging system 1400 where separate portions of the modulated light stream MLS are delivered to respective light sensing devices.

In one set of embodiments, a compressive imaging system 1400 may be configured as shown in FIG. 14. The compressive imaging system includes the light modulation unit 110 as variously described above, and also includes optical subsystem 1410, a set of L light sensing devices $LSD_1$ through $LSD_L$, and a set of L signal acquisition channels $C_1$ through $C_L$, where L in a positive integer.

The light modulation unit 110 receives an incident light stream and modulates the incident light stream with a sequence of spatial patterns to obtain a modulated light stream MLS, e.g., as variously described above.

The optical subsystem 1410 delivers portions (e.g., spatial portions or spectral portions) of the modulated light stream to corresponding ones of the light sensing devices $LSD_1$ through $LDS_L$.

For information on various mechanisms for delivering spatial subsets of the modulated light stream to respective light sensing devices, please see U.S. patent application Ser. No. 13/197,304, filed on Aug. 3, 2011, titled "Decreasing Image Acquisition Time for Compressive Imaging Devices", invented by Woods et al., which is hereby incorporated by reference in its entirety as though fully and completely set forth herein.

In some embodiments, the optical subsystem 1410 includes one or more lenses and/or one or more mirrors arranged so as to deliver spatial portions of the modulated light stream onto respective ones of the light sensing devices. For example, in one embodiment, the optical subsystem 1410 includes a lens whose object plane is the plane of the array of light modulating elements and whose image plane is a plane in which the light sensing devices are arranged. (The light sensing devices may be arranged in an array.)

In some embodiments, optical subsystem 1410 is configured to separate the modulated light stream into spectral components and deliver the spectral components onto respective ones of the light sensing devices. For example, optical subsystem 1410 may include a grating, a spectrometer, or a tunable filter such as a Fabry-Perot Interferometer to achieve the spectral separation.

Each light sensing device $LSD_j$ generates a corresponding electrical signal $v_j(t)$ that represents intensity of the corresponding portion $MLS_j$ of the modulated light stream.

Each signal acquisition channel $C_j$ acquires a corresponding sequence of samples $\{V_j(k)\}$ of the corresponding electrical signal $v_j(t)$. Each signal acquisition channel may include a corresponding amplifier (e.g., a TIA) and a corresponding A/D converter.

The sample sequence $\{V_j(k)\}$ obtained by each signal acquisition channel $C_j$ may be used to reconstruct a corresponding sub-image which represents a spatial portion or a spectral slice of the incident light stream. The number of samples m in each sample sequence $\{V_j(k)\}$ may be less than (typically much less than) the number of pixels in the corresponding sub-image. Thus, each signal acquisition channel $C_j$ may operate as a compressive sensing camera for a spatial portion or spectral portion of the incident light.

Each of the signal acquisition channels may include any subset of the embodiments, features, and elements described above.

Various additional embodiments of systems and methods are disclosed in the following numbered paragraphs.

1. A method comprising: receiving an input signal from a user interface in response to user input; determining a value of a first control parameter in response to the input signal; modulating an incident light stream with a time sequence of spatial patterns to obtain a modulated light stream; sensing the modulated light stream to generate a data stream representative of the modulated light stream; reconstructing a sequence of images from the data stream, wherein each of the images is reconstructed from a corresponding subset of the data stream, wherein the first control parameter value controls at least the image quality of the sequence of images.

2. The method of paragraph 1, further comprising: displaying the sequence of images through a display device; and repeating said receiving and said determining to allow changes to the first control parameter value, wherein said modulating, said sensing, said reconstructing and said displaying are performed as a pipeline process, wherein the image quality of the sequence of images is dynamically adjusted in response to each change of the first control parameter value.

3. The method of paragraph 1, wherein the first control parameter value controls the image quality by controlling one or more of the following: a selection of a reconstruction algorithm to be used to perform said reconstruction of the sequence of images; a number of reconstruction algorithms to be used to perform said reconstruction of the sequence of images; whether or not an adaptive reconstruction algorithm is used to perform said reconstruction of the sequence of images; a size of the subsets of the data stream.

4. The method of paragraph 1, wherein the input signal includes a first component and second component, wherein the first control parameter value is determined based on the first component, the method further comprising: determining a value of a second control parameter based on the second component, wherein the second control parameter value controls the frame rate of the sequence of images.

5. The method of paragraph 4, further comprising: displaying the sequence of images through a display device; and repeating said receiving, said determining of the first control parameter value and said determining of the second control parameter value in order to allow changes to the first control parameter value and/or the second control parameter value, wherein said modulating, said sensing, said reconstructing and said displaying are performed as a pipeline process, wherein the image quality of the sequence of images is dynamically adjusted in response to each change of the first control parameter value, wherein the frame rate of the sequence of images is dynamically adjusted in response to each change of the second control parameter value.

6. The method of paragraph 4, wherein the second control parameter value controls the frame rate by controlling one or more of the following: a number of superpixels into which the spatial patterns are partitioned; a size of a subset to which the spatial patterns are restricted; a size of the subsets of the data stream used to reconstruct corresponding images of the sequence of images; an extent of overlap between consecutive ones of the subsets of the data stream; a sampling rate of an analog-to-digital conversion device that acquires the data stream; an integration time of a light sensing device that senses the modulated light stream.

7. The method of paragraph 4, wherein the first control parameter value and the second control parameter value define a control point in a two-dimensional (2D) control space, wherein the input signal determines a vector displacement of the control point in the 2D control space.

8. The method of paragraph 4, wherein the first control parameter value and the second control parameter value define a control point in a two-dimensional (2D) control space, wherein the input signal determines a position of the control point in the 2D control space.

9. The method of paragraph 4, wherein the first control parameter value and the second control parameter value define a control point in a two-dimensional (2D) control space, the method further comprising: displaying at least a portion of the 2D control space; and displaying the control point within the portion of the 2D control space.

10. The method of paragraph 9, further comprising dynamically updating the display of the control point as the user input is being supplied by a user to the user interface.

11. The method of paragraph 4, wherein the user interface includes an input device that is responsive to two-dimensional input.

12. The method of paragraph 1, wherein the user interface includes a graphical user interface, wherein the user input is applied to the graphical user interface.

13. The method of paragraph 1, wherein said sensing the modulated light stream includes converting the modulated light stream into a sequence of samples of intensity of the modulated light stream, wherein the data stream includes the sequence of intensity samples, wherein each image of the sequence of images is reconstructed from a corresponding subset of the intensity samples whose sample size is smaller than the number of pixels in the image.

14. The method of paragraph 1, wherein said sensing the modulated light stream includes converting spatial portions of the modulated light stream into respective sequences of intensity samples, wherein the data stream includes the sequences of intensity samples.

15. A system comprising:
a user interface configured to generate an input signal in response to user input;
a light modulation unit configured to modulate an incident light stream with a time sequence of spatial patterns to obtain a modulated light stream;
a light sensing device configured to sense the modulated light stream in order to generate a data stream representative of the modulated light stream;
a processor configured to execute program instructions stored in a memory, wherein the program instructions, when executed by the processor, cause the processor to: receive the input signal from the user interface; determine a value of a first control parameter in response to the input signal; reconstruct a sequence of images from the data stream, wherein each of the images is reconstructed from a corresponding subset of the data stream; and control at least an image quality of the sequence of images based on the first control parameter value.

16. The system of paragraph 15, further comprising a display device configured to display the sequence of images, wherein said reconstruction of the sequence of images is performed in real time while the light modulation unit is modulating the incident light stream, wherein the program instructions, when executed by the processor, cause the processor to: repeat said receiving of the input signal and said determining of the first control parameter value to allow changes to the first control parameter value; and dynamically adjust the image quality of the sequence of images in response to each change of the first control parameter value.

17. The system of paragraph 15, wherein the processor is configured to control the image quality by controlling one or more of the following based on the first control parameter value: a selection of a reconstruction algorithm to be used to perform said reconstruction of the sequence of images; a number of reconstruction algorithms to be used to perform said reconstruction of the sequence of images; whether or not an adaptive reconstruction algorithm is used to perform said reconstruction of the sequence of images; a size of the subsets of the data stream.

18. The system of paragraph 15, wherein the input signal includes a first component and a second component, wherein the first control parameter value is determined based on the first component, wherein the program instructions, when executed by the processor, further cause the processor to: determine a value of a second control parameter based on the second component; and control the frame rate of the sequence of images based on the second control parameter value.

19. The system of paragraph 18, further comprising a display device configured to display the sequence of images, wherein said reconstruction of the sequence of images is performed in real time while the light modulation unit is modulating the incident light stream, wherein the program instructions, when executed by the processor, cause the processor to: repeat said receiving of the input signal, said determining of the first control parameter value and said determining of the second control parameter value to allow changes to the first control parameter value and/or the second control parameter value; dynamically adjust the image quality of the sequence of images in response to each change of the first control parameter value; and dynamically adjust the frame rate of the sequence of images in response to each change of the second control parameter value.

20. The system of paragraph 18, wherein the processor is configured to control the frame rate by controlling one or more of the following based on the second control parameter value: a number of superpixels into which the spatial patterns are partitioned; a size of a subset to which the spatial patterns are restricted; a size of the subsets of the data stream used to reconstruct corresponding images of the sequence of images; an extent of overlap between consecutive ones of the subsets of the data stream; a sampling rate of an analog-to-digital conversion device that acquires the data stream; an integration time of a light sensing device that senses the modulated light stream.

21. The system of paragraph 18, wherein the user interface includes an input device that is responsive to two-dimensional input.

22. The system of paragraph 15, wherein the user interface includes a graphical user interface.

23. The system of paragraph 15, wherein the light sensing device is configured to sense the modulated light stream by converting the modulated light stream into a sequence of samples of intensity of the modulated light stream, wherein the data stream includes the sequence of intensity samples, wherein each image of the sequence of images is reconstructed from a corresponding subset of the intensity samples whose sample size is smaller than the number of pixels in the image.

24. The system of paragraph 15, wherein the light sensing device is configured to sense the modulated light stream by converting spatial portions of the modulated light stream into respective sequences of intensity samples, wherein the data stream includes the sequences of intensity samples.

Any of the various embodiments described herein may be combined to form composite embodiments. Furthermore, any of the various features, embodiments and elements described in U.S. Provisional Application No. 61/502,153 may be combined with any of the various embodiments described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving an input signal from a user interface in response to user input, wherein the input signal includes a first component and a second component;
determining a value of a first control parameter in response to the input signal, wherein said determining the value of the first control parameter includes determining the value of the first control parameter based on the first component of the input signal;

determining a value of a second control parameter based on the second component of the input signal, wherein the second control parameter value controls a frame rate of the sequence of images;

reconstructing a sequence of images from a data stream, wherein each of the images is reconstructed from a corresponding subset of the data stream, wherein the data stream is acquired by modulating an incident light stream with a time sequence of spatial patterns to obtain a modulated light stream and by generating the data stream in response to the modulated light stream, wherein the first control parameter value controls at least an image quality of the sequence of images; and displaying the sequence of images via a display device;

wherein said reconstructing and said displaying of the sequence of images are performed while the incident light stream is being modulated and while the data stream is being generated, wherein the method further comprises:

repeating said receiving of the input signal, said determining of the first control parameter value and said determining of the second control parameter value to allow changes to the first control parameter value and/or the second control parameter value, wherein the image quality of the sequence of images is dynamically adjusted in response to each change of the first control parameter value, wherein the frame rate of the sequence of images is dynamically adjusted in response to each change in the second control parameter value.

2. The method of claim 1, wherein said reconstructing and said displaying of the sequence of images are performed while the incident light stream is being modulated and while the data stream is being generated, wherein the method further comprises:

repeating said receiving of the input signal and said determining of the first control parameter value to allow changes to the first control parameter value, wherein the image quality of the sequence of images is dynamically adjusted in response to each change of the first control parameter value.

3. The method of claim 1, wherein the input signal represents a user command to change the image quality, wherein said determining the first control parameter value includes changing the first control parameter value in response to the input signal.

4. The method of claim 3, wherein the input signal specifies a direction to change the image quality.

5. The method of claim 1, wherein the first control parameter value controls the image quality by controlling one or more of the following:

a selection of a reconstruction algorithm to be used to perform said reconstruction of the sequence of images;

a number of reconstruction algorithms to be used to perform said reconstruction of the sequence of images;

whether or not an adaptive reconstruction algorithm is used to perform said reconstruction of the sequence of images;

a size of the subsets of the data stream;

whether or not active illumination is used to illuminate the scene under observation;

a sampling rate of an analog-to-digital conversion device that acquires the data stream;

an integration time of a light sensing device that senses the modulated light stream;

one or more parameters of a reconstruction algorithm to be used to perform said reconstruction;

a selection of one or more post-processing algorithms to apply to the sequence of images;

one or more parameters of one or more post-processing algorithms to be applied to the sequence of images.

6. The method of claim 1, wherein the first component indicates a direction to change the image quality, wherein the second component indicates a direction to change the frame rate.

7. The method of claim 1, wherein the second control parameter value controls the frame rate by controlling one or more of the following:

a number of superpixels into which the spatial patterns are partitioned;

a size of a subset to which the spatial patterns are restricted;

a size of the subsets of the data stream;

an extent of overlap between consecutive pairs of the subsets of the data stream;

a sampling rate of an analog-to-digital conversion device that acquires the data stream;

an integration time of a light sensing device that senses the modulated light stream.

8. The method of claim 1, wherein the first control parameter value and the second control parameter value define a control point in a two-dimensional (2D) control space, wherein the user input determines a vector displacement of the control point in the 2D control space.

9. The method of claim 1, wherein the first control parameter value and the second control parameter value define a control point in a two-dimensional (2D) control space, wherein the user input determines a position of the control point in the 2D control space.

10. The method of claim 1, wherein the first control parameter value and the second control parameter value define a control point in a two-dimensional (2D) control space, wherein the method further comprises:

displaying at least a portion of the 2D control space; and displaying the control point within said at least a portion of the 2D control space.

11. The method of claim 10, further comprising:

dynamically updating the display of the control point as the user input is being supplied by a user.

12. The method of claim 1, wherein said reconstructing and said displaying of the sequence of images are performed after said modulating and generating the data stream have completed.

13. The method of claim 1, wherein the first control parameter value also controls a frame rate of the sequence of images, wherein the input signal is a one-dimensional input signal.

14. The method of claim 1, wherein the user interface includes a graphical user interface (GUI), wherein the input signal is generated by the GUI.

15. The method of claim 14, wherein the GUI includes a touchscreen interface.

16. The method of claim 1, wherein the user interface includes a mechanical input device configured to generate the input signal in response to the user input, wherein the user input is a two-dimensional user input, wherein the input signal is a two-dimensional input signal.

17. The method of claim 1, wherein the user interface includes a mechanical input device configured to generate the input signal in response to the user input, wherein the user input is a one-dimensional user input, wherein the input signal is a one-dimensional input signal.

18. The method of claim 1, wherein said generating the data stream includes converting the modulated light stream into a sequence of samples of intensity of the modulated light stream, wherein the data stream includes the sequence of intensity samples.

19. The method of claim 1, wherein said generating the data stream includes converting spatial portions of the modulated light stream into respective sequences of intensity samples, wherein the data stream includes the sequences of intensity samples, wherein said reconstructing the sequence of images includes reconstructing a plurality of sequences of subimages, wherein each of the sequences of subimages is reconstructed from a corresponding one of the sequences of intensity samples and represents a corresponding spatial portion of a field of view.

20. The method of claim 1, further comprising:
receiving user input specifying one or more regions within a field of view corresponding to the incident light stream; and
modifying the spatial patterns prior said modulating, wherein said modifying the spatial patterns includes nullifying each of the spatial patterns within the one or more regions.

21. The method of claim 1, further comprising:
receiving user input selecting one of a plurality of measurement pattern sets, wherein the spatial patterns used to perform said modulating are drawn from the selected measurement pattern set.

22. A system comprising:
a user interface configured to generate an input signal in response to user input;
a processing unit configured to:
receive the input signal from the user interface, wherein the input signal includes a first component and a second component;
determine a value of a first control parameter in response to the input signal, wherein said determining the value of the first control parameter includes determining the value of the first control parameter based on the first component of the input signal;
determine a value of a second control parameter based on the second component of the input signal;
reconstruct a sequence of images from a data stream, wherein each of the images is reconstructed from a corresponding subset of the data stream, wherein the data stream is acquired by modulating an incident light stream with a time sequence of spatial patterns to obtain a modulated light stream and by generating the data stream in response to the modulated light stream;
control at least an image quality of the sequence of images based on the first control parameter value; and
control a frame rate of the sequence of images based on the second control parameter value; and
display the sequence of images using a display device;
wherein the processing unit is further configured to:
reconstruct and display the sequence of images in real time while the incident light stream is being modulated;
repeat said receiving of the input signal, said determining of the first control parameter value and said determining of the second control parameter value to allow changes to the first control parameter value and/or the second control parameter value;
dynamically adjust the image quality of the sequence of images in response to each change of the first control parameter value, and
dynamically adjust the frame rate of the sequence of images in response to each change in the second control parameter value.

23. The system of claim 22, wherein the input signal represents a user command to change the image quality, wherein said determining the first control parameter value includes changing the first control parameter value in response to the input signal.

24. The system of claim 22, wherein the processing unit is configured to control the image quality by controlling one or more of the following based on the first control parameter value:
a selection of a reconstruction algorithm to be used to perform said reconstruction of the sequence of images;
a number of reconstruction algorithms to be used to perform said reconstruction of the sequence of images;
whether or not an adaptive reconstruction algorithm is used to perform said reconstruction of the sequence of images;
a size of the subsets of the data stream;
whether or not active illumination is used to illuminate the scene under observation;
a sampling rate of an analog-to-digital conversion device that acquires the data stream;
an integration time of a light sensing device that senses the modulated light stream;
one or more parameters of a reconstruction algorithm to be used to perform said reconstruction;
a selection of one or more post-processing algorithms to apply to the sequence of images;
one or more parameters of one or more post-processing algorithms to be applied to the sequence of images.

25. The system of claim 22, wherein the processing unit is configured to control the frame rate by controlling one or more of the following based on the second control parameter value:
a number of superpixels into which the spatial patterns are partitioned;
a size of a subset to which the spatial patterns are restricted;
a size of the subsets of the data stream;
an extent of overlap between consecutive pairs of the subsets of the data stream;
a sampling rate of an analog-to-digital conversion device that acquires the data stream;
an integration time of a light sensing device that senses the modulated light stream.

26. The system of claim 22, wherein the user interface includes a graphical user interface (GUI), wherein the input signal is generated by the GUI.

27. The system of claim 22, wherein the user interface includes a mechanical input device configured to generate the input signal in response to the user input, wherein the user input is a two-dimensional user input, wherein the input signal is a two-dimensional input signal.

28. The system of claim 22, wherein processing unit is also configured to control a frame rate of the sequence of images based on the first control parameter value, wherein the input signal is a one-dimensional input signal.

29. The system of claim 22, wherein the user interface is located remotely from a device that performs the modulating of the incident light stream.

30. The system of claim 22, wherein the processing unit is located remotely from a location where the modulating of the incident light stream is performed.

31. The system of claim 22, wherein the display device is located remotely from the processing unit.

* * * * *